United States Patent
Honda

(10) Patent No.: US 12,292,389 B2
(45) Date of Patent: May 6, 2025

(54) DEFECT INSPECTION APPARATUS

(71) Applicant: Hitachi High-Tech Corporation, Tokyo (JP)

(72) Inventor: Toshifumi Honda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 139 days.

(21) Appl. No.: 17/924,237

(22) PCT Filed: Jun. 5, 2020

(86) PCT No.: PCT/JP2020/022391
§ 371 (c)(1),
(2) Date: Nov. 9, 2022

(87) PCT Pub. No.: WO2021/245937
PCT Pub. Date: Dec. 9, 2021

(65) Prior Publication Data
US 2023/0175982 A1 Jun. 8, 2023

(51) Int. Cl.
*G01N 21/95* (2006.01)
*G01N 21/47* (2006.01)

(52) U.S. Cl.
CPC ......... *G01N 21/9505* (2013.01); *G01N 21/47* (2013.01)

(58) Field of Classification Search
CPC .... G01N 21/88; G01N 21/9505; G01N 21/47; G01N 2021/4792; G01N 2021/8854; G01N 2021/8874; G01N 2021/8883
See application file for complete search history.

(56) References Cited

U.S. PATENT DOCUMENTS

2010/0004875 A1*  1/2010  Urano .............. G01N 21/4738
                                                     356/237.2
2012/0092656 A1   4/2012  Nakao et al.
(Continued)

FOREIGN PATENT DOCUMENTS

JP    2010-14635 A    1/2010
JP    2010-91401 A    4/2010
(Continued)

OTHER PUBLICATIONS

English Translation of International Preliminary Report on Patentability Chapter II mailed Dec. 8, 2022 for PCT International Application No. PCT/JP2020/022391.
(Continued)

*Primary Examiner* — Tarifur R Chowdhury
*Assistant Examiner* — Jonathon Cook
(74) *Attorney, Agent, or Firm* — Volpe Koenig

(57) ABSTRACT

A defect inspection apparatus including a stand that supports a sample, an illumination optical system that irradiates the sample with illumination light, a scanning device that drives the sample stand to change position, detection optical systems that condense illumination scattered light from a surface of the sample, sensors that convert the condensed light into an electric signal and output a detection signal, a storage device that stores a plurality of feature vectors for each defect type, and a signal processing device that processes detection signals input from the plurality of sensors. The signal processing device calculates a measurement vector that is a feature vector of a defect on the surface of the sample, generates a feature vector of a virtual defect in which a form of the detection defect has been changed, from the actual measurement vector, and accumulates the feature vector of the virtual defect of one instruction defect.

10 Claims, 21 Drawing Sheets

(56) References Cited

U.S. PATENT DOCUMENTS

| | | | |
|---|---|---|---|
| 2012/0293795 A1* | 11/2012 | Urano | G01N 21/9501 |
| | | | 356/237.5 |
| 2014/0204194 A1* | 7/2014 | Otani | G01N 21/47 |
| | | | 348/79 |
| 2017/0146463 A1 | 5/2017 | Honda et al. | |
| 2019/0188840 A1 | 6/2019 | Kwon et al. | |
| 2020/0134384 A1* | 4/2020 | Hino | G06V 10/82 |

FOREIGN PATENT DOCUMENTS

| | | |
|---|---|---|
| JP | 2010-164506 A | 7/2010 |
| JP | 2011-13058 A | 1/2011 |
| JP | 2011-179823 A | 9/2011 |
| JP | 2014-178229 A | 9/2014 |
| JP | 2015-197320 A | 11/2015 |

OTHER PUBLICATIONS

International Preliminary Examination Report, PCT/JP2020/022391, dated Jun. 2, 2021. 16 pages.
International Search Report, PCT/JP2020/022391, dated Aug. 20, 2020. 3 pages.

* cited by examiner

DEFECT INSPECTION APPARATUS

TECHNICAL FIELD

The present invention relates to a defect inspection apparatus that inspects a sample surface and outputs a position, a type, a dimension, and the like of a defect.

BACKGROUND ART

In a manufacturing line of a semiconductor substrate, a thin film substrate, or the like, defects on a surface of the semiconductor substrate, the thin film substrate, or the like are inspected in order to improve a product yield. As a defect inspection apparatus used for such defect inspection, there is known a defect inspection apparatus that simultaneously detects scattered light from a sample surface by a plurality of sensors having different positions and acquires detailed information on the position, the shape, the size, and the like of a defect (see PTL 1 and the like).

CITATION LIST

Patent Literature

PTL 1: JP 2011-013058 A

SUMMARY OF INVENTION

Technical Problem

By taking detection signals in various directions for illumination scattered light from the same defect, many pieces of information regarding the defect can be obtained. However, it is difficult to obtain sufficient instruction data by actual measurement, depending on the defect type. For example, in the case of a scratch defect, there are many parameters that change depending on the shape such as the direction and the length of the defect, and it is difficult to acquire sufficient actual measurement data for each combination of the parameters. Therefore, in a case where it is determined whether the detection defect is a defect as a detection target in a feature space, if the instruction data is small, it is not possible to perform highly reliable inspection.

An object of the present invention is to provide a defect inspection apparatus capable of accurately determining a defect to be detected while sufficiently securing an instruction data amount for determining the defect.

Solution to Problem

In order to achieve the above object, the present invention provides a defect inspection apparatus including a sample stand that supports a sample, an illumination optical system that irradiates the sample placed on the sample stand with illumination light, a scanning device that drives the sample stand to change a relative position between the sample and the illumination optical system, a plurality of detection optical systems that condense illumination scattered light from a surface of the sample, a plurality of sensors that convert the illumination scattered light condensed by a corresponding detection optical system into an electric signal and outputs a detection signal, a storage device that stores a plurality of feature vectors for each defect type with respect to an instruction defect for defect determination, and a signal processing device that processes detection signals input from the plurality of sensors. The signal processing device calculates an actual measurement vector that is a feature vector of a detection defect on the surface of the sample detected by the plurality of sensors, generates a feature vector of a virtual defect in which a form of the detection defect has been changed, from the actual measurement vector, and accumulates the feature vector of the virtual defect in the storage device as a feature vector of one instruction defect.

Advantageous Effects of Invention

According to the present invention, a defect to be detected is accurately determined by sufficiently securing an instruction data amount for determining the defect.

DESCRIPTION OF EMBODIMENTS

Hereinafter, embodiments of the present invention will be described with reference to the drawings.

A defect inspection apparatus described as an application target of the present invention in the following embodiments is used for defect inspection of a surface of a sample (wafer) performed during a manufacturing process of a semiconductor or the like, for example. The defect inspection apparatus according to each embodiment is suitable for performing processing of detecting a minute defect and acquiring data regarding the number, position, dimension, and type of defects at a high speed.

First Embodiment

—Defect Inspection Apparatus—

Figure 1:
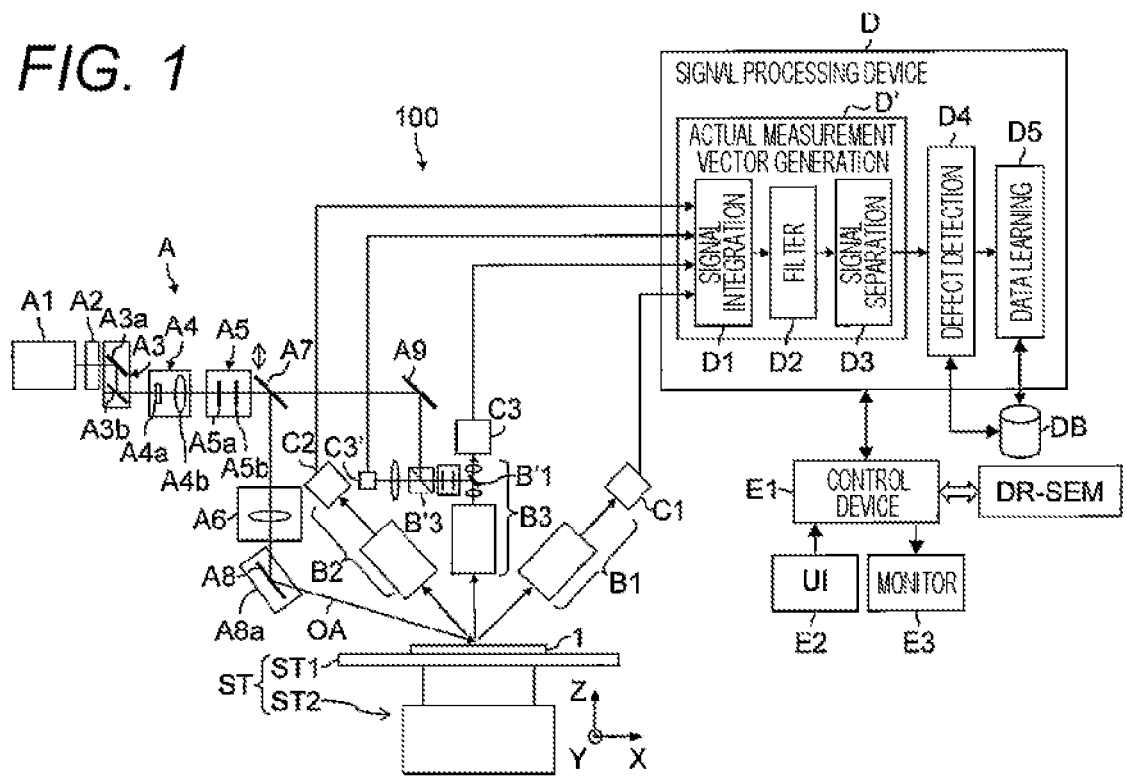
FIG. 1 is a schematic diagram of a configuration example of a defect inspection apparatus according to a first embodiment of the present invention.

FIG. 1 is a schematic diagram of a configuration example of a defect inspection apparatus 100 according to the present embodiment. The defect inspection apparatus 100 according to the present embodiment sets a sample 1 as an inspection target, and detects a defect such as a foreign substance or a recess on the surface of the sample 1, in particular, a defect of a type corresponding to an inspection purpose. As the sample 1, a disk-shaped semiconductor silicon wafer having a flat surface on which no pattern is formed is assumed as a representative example. The defect inspection apparatus 100 includes a stage ST, an illumination optical system A, a plurality of detection optical systems B1 to Bn (n=1, 2, . . . ), sensors C1 to Cn, and C3' (n=1, 2, . . . ), a signal processing device D, a storage device DB, a control device E1, a user interface E2, and a monitor E3.

—Stage—

The stage ST is configured to include a sample stand ST1 and a scanning device ST2. The sample stand ST1 is a stand that supports the sample 1. The scanning device ST2 is a device that drives the sample stand ST1 to change the relative position between the sample 1 and the illumination optical system A. Although not illustrated in detail, the scanning device ST2 is configured to include a translation stage, a rotation stage, and a Z-stage. The rotation stage is configured to be supported by the translation stage via the Z-stage, and the sample stand ST1 is configured to be supported by the rotation stage. The translation stage moves to translate in the horizontal direction together with the rotation stage, and the rotation stage rotates about an axis extending vertically. The Z-stage functions to adjust the height of the surface of the sample 1.

Figure 2:
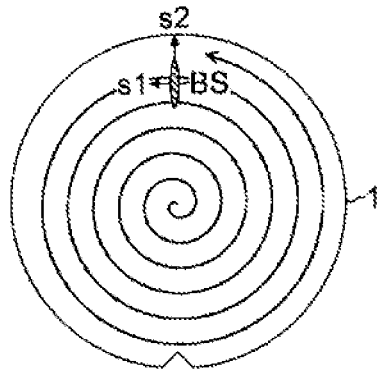
FIG. 2 is a schematic diagram illustrating an example of a scanning trajectory of a sample by a scanning device provided in the defect inspection apparatus according to the first embodiment of the present invention.

FIG. 2 is a schematic diagram illustrating a scanning trajectory of the sample 1 by the scanning device ST2. As will be described later, an illumination spot BS to be irradiated on the surface of the sample 1 with illumination light emitted from the illumination optical system A has illumination intensity distribution that is long in one direction as illustrated in FIG. 2. A long axis direction of the illumination spot BS is set as s2, and a direction intersecting with the long axis (for example, a short axis direction perpendicular to the long axis) is set as s1. The sample 1 is rotated with the rotation of the rotation stage, and thus the illumination spot BS is scanned in the s1 direction relative to the surface of the sample 1. In addition, the sample 1 is moved in the horizontal direction with the translation of the translation stage, and thus the illumination spot BS is scanned in the s2 direction relative to the surface of the sample 1. Since the sample 1 is moved while rotated by an operation of the scanning device ST2, as illustrated in FIG. 2, the illumination spot BS moves from the center to the outer edge of the sample 1 in a spiral trajectory, and thus the entire surface of the sample 1 is scanned. The illumination spot BS moves in the s2 direction by a distance equal to or less than the length of the illumination spot BS in the s2 direction, while the sample 1 makes one rotation.

Figure 3:
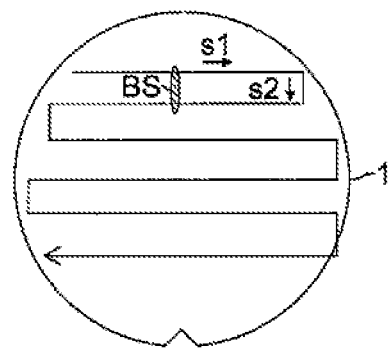
FIG. 3 is a schematic diagram illustrating another example of the scanning trajectory of the sample by the scanning device provided in the defect inspection apparatus according to the first embodiment of the present invention.

Note that it is also possible to apply a scanning device having a configuration in which another translation stage having a movement axis extending in a direction intersecting with a movement axis of the translation stage in a horizontal plane is provided instead of the rotation stage. In this case, as illustrated in FIG. 3, the illumination spot BS scans the surface of the sample 1 while folding a linear trajectory instead of a helical trajectory. Specifically, the first translation stage is translationally driven at a constant speed in the s1 direction, and the second translation stage is driven in the s2 direction by a predetermined distance (for example, a distance equal to or less than the length of the illumination spot BS in the s2 direction). Then, the first translation stage is folded back in the s1 direction and translationally driven again. As a result, the illumination spot BS repeats linear scanning in the s1 direction and movement in the s2 direction to scan the entire surface of the sample 1. As compared with such a scanning method, a spiral scanning method illustrated in FIG. 2 does not involve a reciprocating operation, which is advantageous in performing the sample inspection for a short time.

—Illumination Optical System—

The illumination optical system A illustrated in FIG. 1 is configured to include an optical element group in order to irradiate the sample 1 placed on the sample stand ST1 with desired illumination light. As illustrated in FIG. 1, the illumination optical system A includes a laser light source A1, an attenuator A2, an emission light adjustment unit A3, a beam expander A4, a polarization control unit A5, a condensing optical unit A6, reflection mirrors A7 to A9, and the like.

Laser Light Source

The laser light source A1 is a unit that emits a laser beam as illumination light. In a case where the defect inspection apparatus 100 detects a minute defect in the vicinity of the surface of the sample 1, a laser light source that oscillates a high-output laser beam having an output of 2 W or more in ultraviolet or vacuum ultraviolet having a short wavelength (wavelength of 355 nm or less) that hardly penetrates the inside of the sample 1 is used as the laser light source A1. The diameter of the laser beam emitted from the laser light source A1 is typically about 1 mm. In a case where the defect inspection apparatus 100 detects a defect in the sample 1, a laser light source that oscillates a visible or infrared laser beam that has a long wavelength and easily penetrates the sample 1 is used as the laser light source A1.

Attenuator

Figure 4:
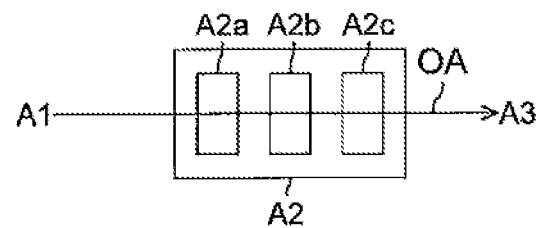
FIG. 4 is a schematic diagram illustrating an extracted attenuator provided in the defect inspection apparatus according to the first embodiment of the present invention.

FIG. 4 is a schematic view illustrating the attenuator A2 extracted. The attenuator A2 is a unit that attenuates the light intensity of the illumination light from the laser light source A1. In the present embodiment, a configuration in which a first polarizing plate A2a, a ½ wavelength plate A2b, and a second polarizing plate A2c are combined is exemplified. The ½ wave plate A2b is configured to be rotatable around the optical axis of the illumination light. The illumination light incident on the attenuator A2 is converted into linearly polarized light by the first polarizing plate A2a. Then, the polarization direction is adjusted to the slow axis azimuth angle of the ½ wavelength plate A2b, and the light having the adjusted polarization direction passes through the second polarizing plate A2c. By adjusting the azimuth angle of the ½ wave plate A2b, it is possible to attenuate the light intensity of the illumination light at any ratio. In a case where the linear polarization degree of the illumination light incident on the attenuator A2 is sufficiently high, the first polarizing plate A2a can be omitted. Note that the attenuator A2 is not limited to the configuration illustrated in FIG. 4, and may be configured by using an ND filter having gradation density distribution, or may be configured such that the attenuation effect can be adjusted by a combination of a plurality of ND filters having different densities.

Emission Light Adjustment Unit

The emission light adjustment unit A3 illustrated in FIG. 1 is a unit that adjusts the angle of the optical axis of the illumination light attenuated by the attenuator A2, and is configured to include a plurality of reflection mirrors A3a and A3b in the present embodiment. Although the configuration in which the illumination light is sequentially reflected by the reflection mirrors A3a and A3b is made, in the present embodiment, the incident/emission surface of the illumination light with respect to the reflection mirror A3a is configured to be perpendicular to the incident/emission surface of the illumination light with respect to the reflection mirror A3b. The incident/emission surface is a surface including an optical axis incident on the reflection mirror and an optical axis emitted from the reflection mirror. For example, in a case where a three-dimensional XYZ orthogonal coordinate system is defined and the illumination light is incident on the reflection mirror A3a in a +X direction, the illumination light is deflected in a +Y direction by the reflection mirror A3a and then deflected in a +Z direction by the reflection mirror A3b, although this is different from the schematic diagram of FIG. 1. In this example, the incident/emission surface of the illumination light with respect to the reflection mirror A3a is an XY plane, and the incident/emission surface with respect to the reflection mirror A3b is a YZ plane. Although not illustrated, the reflection mirrors A3a and A3b are provided with a mechanism for moving the reflection mirrors A3a and A3b in translation and a mechanism for tilting the reflection mirrors A3a and A3b. For example, the reflection mirrors A3a and A3b move parallel to the incident direction or the emission direction of the illumination light with respect to the reflection mirrors A3a and A3b, and tilt around the normal line to the incident/emission surface. As a result, for example, for the optical axis of the illumination light emitted from the emission light adjustment unit A3 in the +Z direction, it is possible to independently adjust the offset amount and the angle in the XZ plane and the offset amount and the angle in the YZ plane. The configuration using the two reflection mirrors A3a and A3b has been exemplified in the present example, but a configuration using three or more reflection mirrors may be used.

Beam Expander

The beam expander A4 is a unit that enlarges a light flux diameter of incident illumination light, and includes a plurality of lenses A4a and A4b. A Galileo type using a concave lens as the lens A4a and a convex lens as the lens A4b can be exemplified as the beam expander A4. The beam expander A4 is provided with an interval adjustment mechanism (zoom mechanism) of the lenses A4a and A4b, and the magnification ratio of the light flux diameter changes by adjusting the interval between the lenses A4a and A4b. The magnification ratio of the light flux diameter by the beam expander A4 is, for example, about 5-10 times. In this case, assuming that the beam diameter of the illumination light emitted from the laser light source A1 is 1 mm, the beam system of the illumination light is enlarged to about 5 –10 mm. In a case where the illumination light incident on the beam expander A4 is not a parallel light flux, collimation (quasi-collimation of the light flux) can be performed together with the light flux diameter by adjusting the interval between the lenses A4a and A4b. However, a configuration in which the collimation of the light flux is performed by installing a collimating lens separately from the beam expander A4 on an upstream side of the beam expander A4.

Note that the beam expander A4 is installed on a translation stage of two or more axes (two degrees of freedom), and is configured to be able to adjust the position so that the center coincides with the incident illumination light. Further, the beam expander A4 also has a tilt angle adjustment function of two or more axes (two degrees of freedom) so that the optical axis coincides with the incident illumination light.

Polarization Control Unit

The polarization control unit A5 is an optical system that controls the polarization state of the illumination light, and is configured to include a ½ wavelength plate A5a and a ¼ wavelength plate A5b. For example, in a case where obliquely incident illumination is performed by placing a reflection mirror A7 to be described later in an optical path, the illumination light is P-polarized by the polarization control unit A5, so that the amount of scattered light from a defect on the surface of the sample 1 increases as compared with polarized light other than the P-polarized light. In a case where scattered light (referred to as haze) from minute irregularities on the surface of the sample itself interferes with the detection of minute defects, the illumination light is S-polarized light, thereby it is possible to reduce the haze as compared with polarized light other than S-polarized light. The polarization control unit A5 can also make the illumination be circularly polarized light or 45-degree polarized light between the P-polarized light and the S-polarized light.

Reflection Mirror

As illustrated in FIG. 1, the reflection mirror A7 is moved in parallel in the arrow direction by a driving mechanism (not illustrated) to enter and exit from the optical path of the illumination light toward the sample 1, and can switch the incident path of the illumination light on the sample 1. By inserting the reflection mirror A7 into the optical path, the illumination light emitted from the polarization control unit A5 as described above is reflected by the reflection mirror A7 and is obliquely incident on the sample 1 through the condensing optical unit A6 and the reflection mirror A8. On the other hand, when the reflection mirror A7 is removed from the optical path, the illumination light emitted from the polarization control unit A5 is perpendicularly incident on the sample 1 through a reflection mirror A9, a polarization beam splitter B'3, a polarization control unit B'2, a reflection mirror B'1, and a detection optical system B3.

Figure 5:
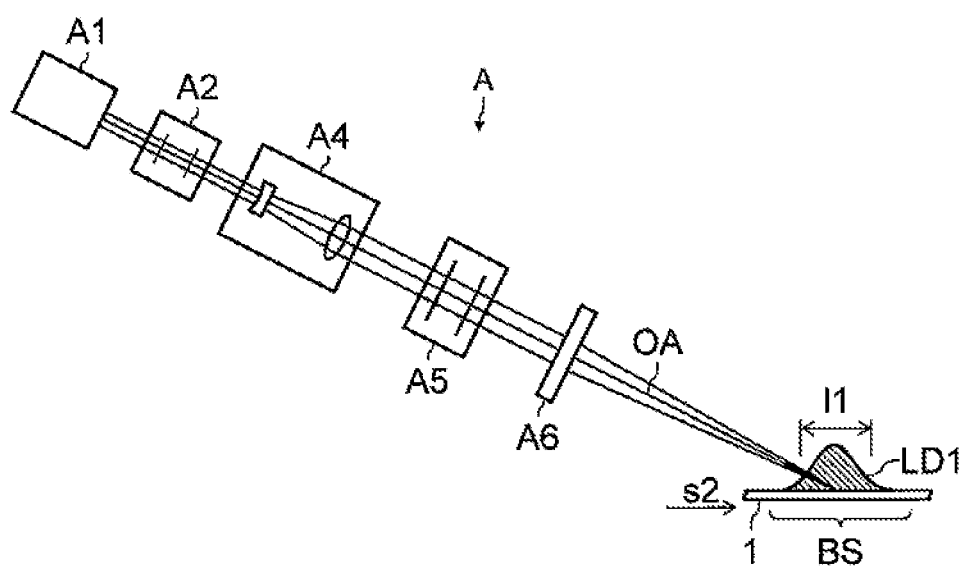
FIG. 5 is a diagram schematically illustrating a positional relationship between an optical axis of illumination light and an illumination intensity distribution shape in a cross section obtained by cutting the sample on an incident surface of the illumination light incident on the sample, the illumination light being obliquely guided to a surface of the sample by an illumination optical system provided in the defect inspection apparatus according to the first embodiment of the present invention.
Figure 6:
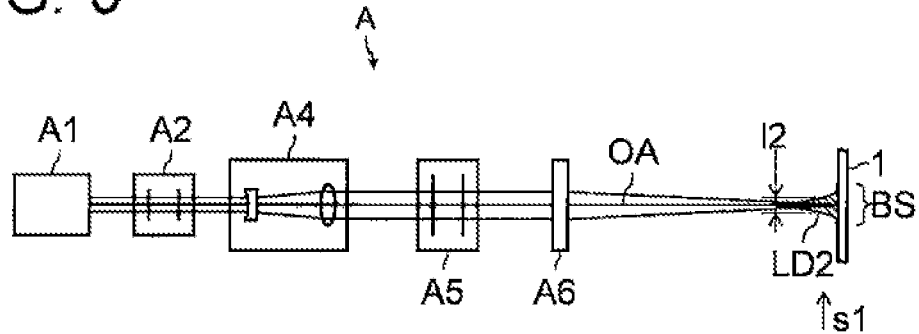
FIG. 6 is a diagram schematically illustrating a positional relationship between an optical axis of illumination light and an illumination intensity distribution shape in a cross section obtained by cutting the sample in a plane that is perpendicular to the incident surface of the illumination light on the sample and includes a normal line of the surface of the sample, the illumination light being obliquely guided to the surface of the sample by the illumination optical system provided in the defect inspection apparatus according to the first embodiment of the present invention.

FIGS. 5 and 6 are schematic diagrams illustrating a positional relationship between the optical axis of the illumination light guided obliquely to the surface of the sample 1 by the illumination optical system A and the illumination intensity distribution shape. FIG. 5 schematically illustrates a cross section of sample 1 cut along the incident surface of the illumination light incident on the sample 1. FIG. 6 schematically illustrates a cross section of the sample 1 cut along a plane that is perpendicular to the incident surface of the illumination light incident on the sample 1 and includes the normal line of the surface of the sample 1. The incident surface is a surface including an optical axis OA of the illumination light incident on the sample 1 and the normal line of the surface of the sample 1. Note that, FIGS. 5 and 6 illustrate a portion of the illumination optical system A in an extracted state. For example, the emission light adjustment unit A3 and the reflection mirrors A7 and A8 may not be illustrated.

In a case where the reflection mirror A7 is inserted into the optical path, the illumination light emitted from the laser light source A1 is condensed by the condensing optical unit A6, reflected by the reflection mirror A8, and then obliquely incident on the sample 1. As described above, the illumination optical system A is configured such that the illumination light can be incident on the sample 1 from a direction inclined with respect to the normal line of the surface of the sample 1. In such obliquely incident illumination, the light intensity is adjusted by the attenuator A2, the light flux diameter is adjusted by the beam expander A4, and the polarization is adjusted by the polarization control unit A5, and thus the illumination intensity distribution is made uniform in the incident surface. As in illumination intensity distribution (illumination profile) LD1 illustrated in FIG. 5, the illumination spot formed on the sample 1 has Gaussian light intensity distribution in the s2 direction, and the length of a beam width l1 defined by 13.5% of the peak is, for example, about 25 μm to 4 mm.

In a plane perpendicular to the incident surface and the sample surface, as in illumination intensity distribution (illumination profile) LD2 illustrated in FIG. 6, the illumination spot has light intensity distribution in which the intensity around the center of the optical axis OA is weak. Specifically, Gaussian distribution reflecting the intensity distribution of the light incident on the condensing optical unit A6 or intensity distribution similar to the Bessel function or the sinc function of the first order reflecting the opening shape of the condensing optical unit A6 is obtained. The length l2 of the illumination intensity distribution in the plane perpendicular to the incident surface and the sample surface is set to be shorter than the beam width 11 illustrated in FIG. 5, for example, about 1.0 μm to 20 μm, in order to reduce the haze generated from the surface of the sample 1. The length 12 of the illumination intensity distribution is the length of a region having the illumination intensity of 13.5% or more of the maximum illumination intensity in the plane perpendicular to the incident surface and the sample surface.

In addition, the incident angle of the obliquely incident illumination with respect to the sample 1 (the inclination angle of the incident optical axis with respect to the normal line of the sample surface) is adjusted to an angle suitable for detecting a minute defect by the positions and the angles of the reflection mirrors A7 and A8. The angle of the reflection mirror A8 is adjusted by an adjustment mechanism A8a. For example, the larger the incident angle of the illumination light with respect to the sample 1 (the smaller the illumination elevation angle, which is the angle between the sample surface and the incident optical axis), the weaker the haze that becomes noise with respect to the scattered light from minute foreign substances on the sample surface. Thus, it is suitable for detecting a minute defect. From the viewpoint of suppressing the influence of the haze on the detection of the minute defect, it is preferable to set the incident angle of the illumination light to, for example, 75 degrees or more (elevation angle of 15 degrees or less). On the other hand, in the obliquely incident illumination, the smaller the illumination incident angle, the more the absolute amount of scattered light from minute foreign substances. Thus, it is preferable to set the incident angle of the illumination light to, for example, 60 degrees or more and 75 degrees or less (elevation angle of 15 degrees or more and 30 degrees or less) from the viewpoint of aiming at an increase in the amount of scattered light from the defect.

Detection Optical System

The detection optical systems B1 to Bn (n=1, 2, . . . ) are unit that condense illumination scattered light from the sample surface, and are configured to include a plurality of optical elements including a condenser lens (objective lens). n of the detection optical system Bn represents the number of detection optical systems, and a case where 13 sets of detection optical systems are provided in the defect inspection apparatus 100 of the present embodiment will be described as an example (n 13).

Figure 7:
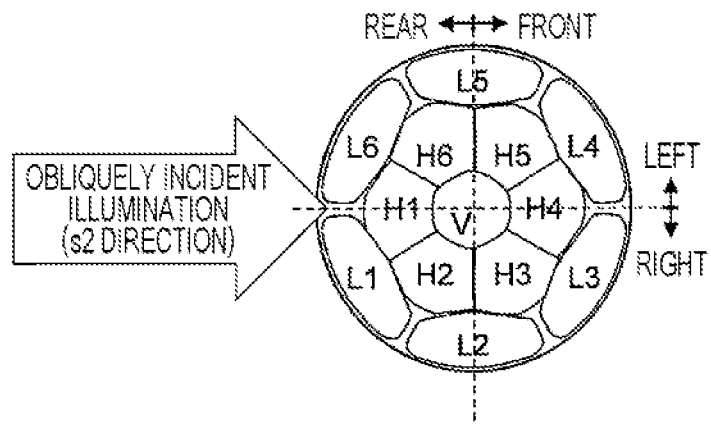
FIG. 7 is a diagram illustrating a region when viewed from the top, the region in which a detection optical system provided in the defect inspection apparatus according to the first embodiment of the present invention collects scattered light.

FIG. 7 is a diagram illustrating a region where the detection optical systems B1 to B13 collect scattered light when viewed from the top, and corresponds to the arrangement of the objective lenses of the detection optical systems B1 to B13. In the following description, by using, as a reference, the incident direction of the obliquely incident illumination on the sample 1, the traveling direction (right direction in FIG. 7) of the incident light on the illumination spot BS on the surface of the sample 1 when viewed from the top is handled as the front, and the opposite direction (same left direction) is handled as the rear. Therefore, with respect to the illumination spot BS, the lower side in FIG. 7 is set to the right side and the upper side is set to the left side.

The objective lenses of the detection optical systems B1 to B13 are arranged along the hemispherical surface of the upper half of the sphere (celestial sphere) centered on the illumination spot BS with respect to the sample 1. The hemispherical surface is divided into 13 regions of regions L1 to L6, H1 to H6, and V, and the detection optical systems B1 to B13 collect and condense scattered light in the respective corresponding regions.

The region V is a region overlapping the zenith, and is located immediately above the illumination spot BS formed on the surface of the sample 1.

The regions L1 to L6 are regions obtained by equally dividing an annular region surrounding the circumference of 360 degrees of the illumination spot BS at a low position. The regions L1, L2, L3, L4, L5, and L6 are arranged in this order counterclockwise from the incident direction of the obliquely incident illumination when viewed from the top. Among the regions L1 to L6, the regions L1 to L3 are located on the right side of the illumination spot BS, the region L1 is located on the right rear side of the illumination spot BS, the region L2 is located on the right side, and the region L3 is located on the right front side. The regions L4 to L6 are located on the left side of the illumination spot BS, the region L4 is located on the left front side of the illumination spot BS, the region L5 is located on the left side, and the region L6 is located on the left rear side.

The remaining region H1 to H6 is a region obtained by equally dividing an annular region surrounding the circumference of 360 degrees of the illumination spot BS at a high position (between the region L1 to L6 and the region V), and the regions H1, H2, H3, H4, H5, and H6 are arranged in this order counterclockwise from the incident direction of the oblique incident illumination when viewed from above. The arrangement of the high-angle regions H1 to H6 is shifted by 30 degrees with respect to the low-angle regions L1 to L6 when viewed from the top. Among the regions H1 to H6, the region H1 is located on the rear side of the illumination spot BS, and the region H4 is located on the front side. The regions H2 and H3 are located on the right side of the illumination spot BS, the region H2 is located on the right rear side of the illumination spot BS, and the region H3 is located on the right front side. The regions H5 and H6 are located on the left side of the illumination spot BS, the region H5 is located on the left front side of the illumination spot BS, and the region H6 is located on the left rear side of the illumination spot BS.

In FIG. 1, the scattered light incident on the detection optical systems B1 to Bn is condensed and guided to the corresponding sensors C1 to Cn. In a case where FIG. 1 is compared with FIG. 7, for example, the detection optical system B1 in FIG. 1 can be handled as an example of an optical system that collects scattered light in the region L4 in FIG. 7, the detection optical system B2 in FIG. 1 can be handled as an example of an optical system that collects scattered light in the region L6, and the detection optical system B3 in FIG. 7 can be handled as an example of an optical system that collects scattered light in the region V. Note that, in the present embodiment, the scattered light incident on the detection optical system B3 is branched in the optical path by the reflection mirror B'1 and guided to the sensor C3' in addition to the sensor C3.

Figure 8:
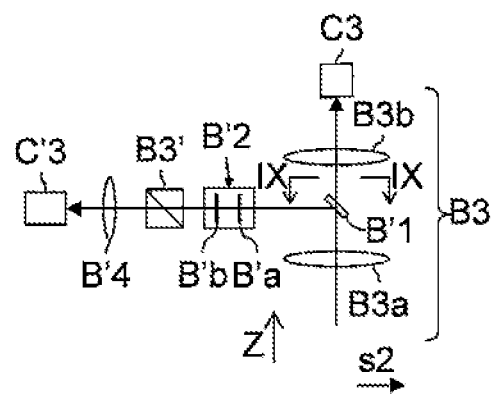
FIG. 8 is a configuration diagram of the detection optical system on which scattered light emitted from the sample in a normal direction is incident, the detection optical system being provided in the defect inspection apparatus according to the first embodiment of the present invention.
Figure 9:
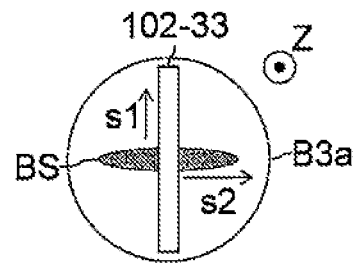
FIG. 9 is an arrow view taken along line IX-IX in FIG. 8.

FIG. 8 is a configuration diagram of the detection optical system B3 on which scattered light emitted from the sample 1 in the normal direction is incident. FIG. 9 is an arrow view taken along line IX-IX in FIG. 8. The detection optical system B3 is configured to include a condenser lens (objective lens) B3a and an imaging lens B3b. Scattered light condensed by the condenser lens B3a is guided to the sensor C3 by the imaging lens B3b. This point is the same as the other detection optical systems B1, B2, B4, . . . , and the like. The detection optical system B3 is different from the other detection optical systems in that the reflection mirror B'1 is disposed at the position of the own pupil between the condenser lens B3a and the imaging lens B3b. As described above, during epi-illumination, illumination light is incident on the sample 1 from the normal direction through the reflection mirror B'1. Therefore, the condenser lens B3a of the detection optical system B3 also serves as a condenser lens that guides epi-illumination to the sample 1.

On the other hand, the reflection mirror B'1 also functions to branch an optical path of a portion of scattered light incident on the detection optical system B3 from the illumination spot BS by obliquely incident illumination or epi-illumination. It has been described above that the illumination spot BS has long linear intensity distribution in the s2 direction. The reflection mirror B'1 has a shape that is longer than the illumination spot BS in the short axis direction (s1 direction) of the linear illumination spot BS and is shorter than the illumination spot BS in the long axis direction (s2 direction) of the illumination spot BS, when viewed from the side of the sensor C3 as illustrated in FIG. 9. As a result, scattered light that is incident on the detection optical system B3 from the sample 1 and does not interfere with the reflection mirror B1' is incident on the sensor C3 through the imaging lens B3b, but scattered light that interferes with the reflection mirror B'1 is reflected by the reflection mirror B'1.

The scattered light incident on the detection optical system B3 from the sample 1 and reflected by the reflection mirror B'1 is guided to the sensor C3' through the polarization control unit B'2, the polarization beam splitter B'3, and the imaging lens B'4. Similarly to the polarization control unit A5, the polarization control unit B'2 includes a ¼ wavelength plate B'a and a ½ wavelength plate B'b, and can adjust the illumination scattered light incident from the reflection mirror B'1 to any polarization. During oblique illumination, the polarization control unit B'2 controls the polarization of the illumination scattered light incident on the polarization beam splitter B'3 such that the illumination scattered light reflected by the reflection mirror B'1 is transmitted through the polarization beam splitter B'3 and then incident on the imaging lens B'4. In addition, even under the condition of epi-illumination in which the reflection mirror A7 is removed from the optical path, the polarization control unit B'2 can control the polarization of the illumination light such that the illumination light traveling toward the sample 1 is incident on the detection optical system B3 with polarization in any direction (for example, circularly polarized light).

—Sensor—

The sensors C1 to Cn and C3' are single-pixel point sensors that convert illumination scattered light condensed by the corresponding detection optical systems into an electric signal and output a detection signal. For example, a photomultiplier tube or a silicon photomultiplier (SiPM) that photoelectrically converts a weak signal with a high gain can be used. The sensors C1, C2, C3, . . . correspond to the detection optical systems B1, B2, B3, . . . . Note that the detection optical system B3 corresponds to the sensor C3' in addition to the sensor C3 as described above. The detection signals output from the sensors C1 to Cn and C3' are input to the signal processing device D as needed.

—Control Device—

The control device E1 is a computer that integrally controls the defect inspection apparatus 100, and is configured to include a CPU, an FPGA, a timer, and the like in addition to a ROM, a RAM, and other memories. The control device E1 is connected to the user interface E2, the monitor E3, and the signal processing device D in a wired or wireless manner. The user interface E2 is a device to which a user inputs various operations, and various input devices such as a keyboard, a mouse, and a touch panel can be appropriately adopted. An encoder of the rotation stage or the translation stage, an inspection condition input from the user interface E2 in accordance with the operation of an operator, and the like are input to the control device E1. The inspection condition includes, for example, the type, the size, the shape, the material, the illumination condition, the detection condition, and the like of the sample 1. In addition, the control device E1 outputs a command signal for instructing the operation of the stage ST, the illumination optical system A, and the like in accordance with the inspection condition, or outputs coordinate data of the illumination spot BS synchronized with the defect detection signal to the signal processing device D. The control device E1 also displays and outputs a defect inspection result by the signal processing device D on the monitor E3. As illustrated in FIG. 1, a defect review-scanning electron microscope (DR-SEM) that is an electron microscope for defect inspection may be connected to the control device E1. In this case, data of the defect inspection result from the DR-SEM can be received by the control device E1 and transmitted to the signal processing device D.

—Signal Processing Device—

The signal processing device D is a computer that processes the detection signals input from the sensors C1 to Cn and C3', and is configured to include a CPU, an FPGA, a timer, and the like in addition to a ROM, a RAM, and other memories as in the control device E1. Although it is assumed as an example that the signal processing device D is configured by a single computer forming a unit with the apparatus body (stage, illumination optical system, detection optical system, sensor, and the like) of the defect inspection apparatus 100, the signal processing device D may be configured by a plurality of computers. In this case, a server can be used as one of the plurality of computers. This is an example in which the server is included as the component of the defect inspection apparatus 100. For example, a configuration in which a computer attached to the apparatus body acquires a defect detection signal from the apparatus body, processes detection data as necessary, and transmits the processed detection data to a server, and the server performs processing such as defect detection and classification can be made.

In the present embodiment, the signal processing device D is configured to include an actual measurement vector generation circuit D', a defect detection circuit D4, and a data learning circuit D5. The actual measurement vector generation circuit D' is a circuit that calculates a feature vector (actual measurement vector) of a detection defect on the surface of the sample 1 detected by the sensors C1 to C13. In the present embodiment, as an example, a configuration in which the actual measurement vector generation circuit D' includes the signal integration circuit D1, the filter circuit D2, and the signal separation circuit D3 will be described, but how to generate the actual measurement vector from the detection signal can be appropriately changed. Each circuit of the signal processing device D can be configured by, for example, an FPGA. In addition, at least some of the functions of the circuits (particularly, processing being downstream processes) can also be performed by a server.

—Signal Integration Circuit—

Figure 10:
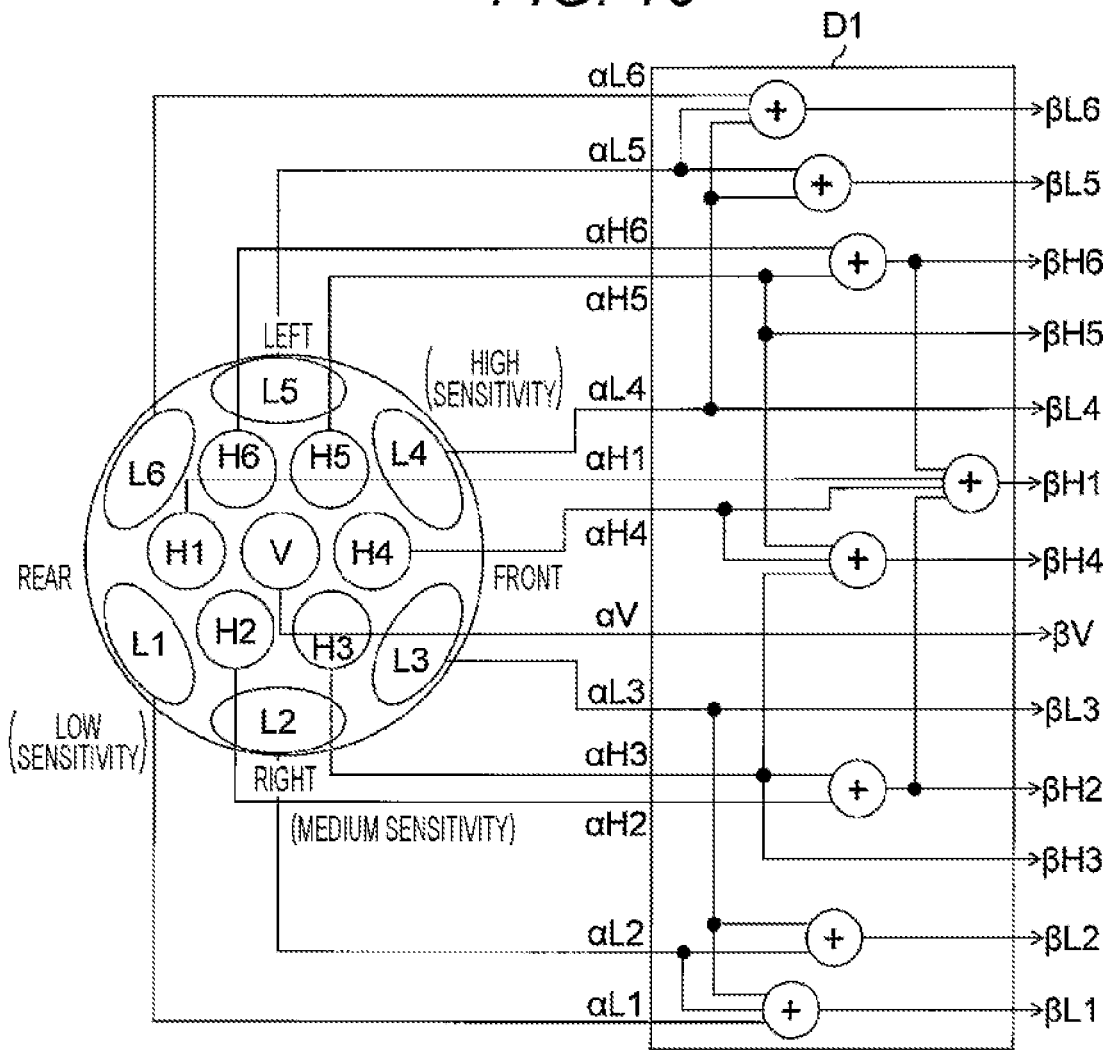
FIG. 10 is a schematic diagram of an example of a signal integration circuit of a signal processing device provided in the defect inspection apparatus according to the first embodiment of the present invention.

FIG. 10 is a schematic diagram of an example of the signal integration circuit D1 in the signal processing device D. The detection signal α photoelectrically converted by the sensors C1 to C13 and C3' is input to the signal processing device D, and thus is converted into a digital signal by an A/D converter (not illustrated), and input to the signal integration circuit D1. Each detection signal α input to the signal integration circuit D1 is distinguished by using a region (regions L1 to L6, H1 to H6, and V described with reference to FIG. 7) in which scattered light set as the base is condensed as a suffix. The signal integration circuit D1 is configured to include a plurality of adders, and generates and outputs a first signal group including at least one integrated signal obtained by adding a plurality of detection signals in a predetermined combination based on a group of detection signals simultaneously input from a plurality of sensors. The output first signal group is recorded in the memory (for example, the memory of the signal processing device D or a memory of a device connected to the signal processing device D).

Note that the "group of detection signals" refers to a signal group including detection signals αL1 to αL6, αH1 to αH6, and αV having the same detection time. The "first signal group" is a signal group including, as constituent signals, signals βL1 to βL6, βH1 to βH6, and βV obtained by adding other detection signals as necessary under a predetermined rule, based on the detection signals αL1 to αL6, αH1 to αH6, and αV detected simultaneously.

In the case of the oblique illumination, generally, the intensity of scattered light scattered forward from the sample surface is relatively high, and the detection sensitivity of the scattered light is lower in the region on the back side than in the region on the front side. Therefore, in the present embodiment, the signal integration circuit D1 generates the integrated signal by adding at least one other detection signal to one detection signal based on the backward scattered light and outputs the integrated signal instead of the original signal having a low value for the detection signal of the backward scattered light. As a result, the signal based on the backward scattered light is amplified up to a signal level suitable for the processing of the filter circuit D2.

At this time, a case where a space above the sample 1 is divided into two pieces in the left and right direction on the plane including the optical axis CA (FIG. 1) of the illumination light incident on the sample 1 and the normal line of the sample 1, that is, a case where the space above the sample 1 is divided into pieces on the left and right of the illumination spot BS is considered. In the present embodiment, the signal integration circuit D1 is configured to, when generating the integrated signal, add the detection signals detected by the plurality of detection optical systems in which the respective objective lenses are arranged in the same space on the left and right sides. Specifically, in the space on the same side, the detection signal based on the illumination scattered light scattered forward is added to the detection signal based on the illumination scattered light scattered backward when viewed in the incident direction of the illumination light. In addition, the detection signals of the low-angle scattered light are added to each other, and the detection signals of the high-angle scattered light are added to each other. For example, the detection signal αL4 caused by the scattered light supplemented in the front left low-angle region L4 is added to the detection signal αL6 caused by the scattered light supplemented in the rear left low-angle region L6.

On the other hand, the signal integration circuit D1 outputs at least one of the plurality of detection signals based on the illumination scattered light forward scattered, as an element of the first signal group as a non-integrated signal without addition with another signal. This is because the detection signal of the forward scattered light originally has a high signal level, and, when the detection signal is combined with other signals, reliability may be deteriorated.

Specifically, in the present embodiment, based on the group of detection signals αL1 to αL6, αH1 to αH6, and αV, the signals βL1 to βL6, βH1 to βH6, and βV constituting the first signal group are calculated by the following combination as illustrated in FIG. 10.

$\beta L1 = \alpha L1(+\alpha L2 + \alpha L3)$: integrated signal $\beta L2 = \alpha L2(+\alpha L3)$: integrated signal $\beta L3 = \alpha L3$: non-integrated signal $\beta L4 = \alpha L4$: non-integrated signal $\beta L5 = \alpha L5(+\alpha L4)$: integrated signal $\beta L6 = L6(+\alpha L4 + \alpha L5)$: integrated signal $\beta H1 = \alpha H1(+\alpha H2 + \alpha H3 + \alpha H4 + \alpha H5 + \alpha H6)$: integrated signal $\beta H2 = \alpha H2(+\alpha H3)$: integrated signal $\beta H3 = \alpha H3$: non-integrated signal $\beta H4 = \alpha H4(+\alpha H3 + \alpha H5)$: integrated signal $\beta H5 = \alpha H5$: non-integrated signal $\beta H6 = \alpha H6(+\alpha H5)$: integrated signal $\beta V = \alpha V$ (non-integrated signal)

—Filter Circuit—

The filter circuit D2 increases the SN ratios of the signals βL1 to βV, βH1 to βH6, and βV constituting the first signal group generated by the signal integration circuit D1, and generates and outputs the signals γL1 to γL6, γH1 to γH6, and γV constituting a second signal group. The output second signal group is recorded in the memory (for example, the memory of the signal processing device D or a memory of a device connected to the signal processing device D). Simply, in a case where the signal value does not satisfy the setting value corresponding to any of the signals βL1, . . . , and βV, processing of removing the data of the first signal group can be performed. However, in the present embodiment, the filter circuit D2 performs the filter processing on each of the signals βL1, . . . , and βV constituting the first signal group based on the illumination profile of the illumination spot BS on the surface of the sample 1.

First Example of Filter Circuit

Figure 11:
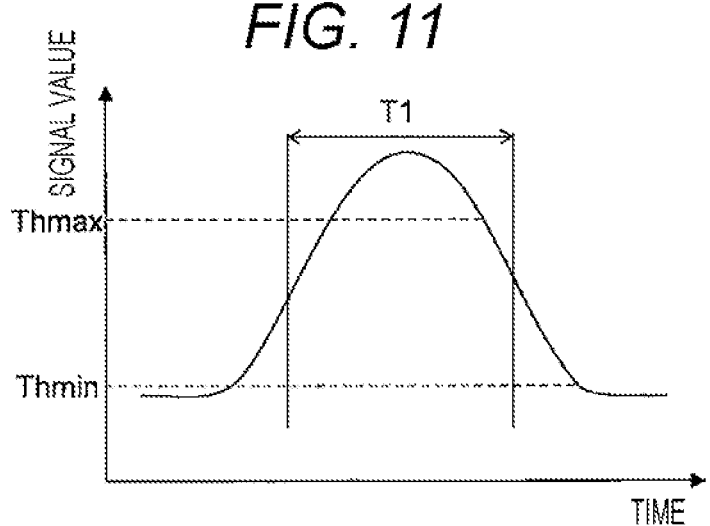
FIG. 11 is an explanatory diagram of a first example of filter processing performed by a filter circuit of the signal processing device provided in the defect inspection apparatus according to the first embodiment of the present invention.

FIG. 11 is an explanatory diagram of a first example of the filter processing performed by the filter circuit D2 of the signal processing device D. The horizontal axis represents the time, and the vertical axis represents the signal value. The time represented by the horizontal axis corresponds to the θ coordinate of a signal sampling point on a line of the same r coordinate on the surface of the sample 1. The signal waveform illustrated in FIG. 11 is a waveform obtained in a case where a predetermined minute foreign substance passes through the illumination spot BS, and corresponds to the illumination profile of the illumination spot BS in the s1 direction (the rotation direction of the sample 1 in the case of scanning in a spiral trajectory). The feature of the illumination profile is defined, for example, that the minimum value of a signal during a predetermined time T1 (for example, the time corresponding to the length 12 in FIG. 6) is equal to or more than a first threshold value Thmin and the maximum value of the signal during the same predetermined time T1 is equal to or more than a second threshold value Thmax. As a result, for any signal. θ (for example, the signal βL1) input to the filter circuit D2, in a case where the minimum value of the signal during the predetermined time T1 is equal to or more than the first threshold value Thmin, and the maximum value thereof is equal to or more than the second threshold value Thmax, it can be determined that there is a possibility that the signal is a signal of scattered light from the defect. In a case where it is determined that there is a possibility, for example, an average value of the signal values during the predetermined time T1 is calculated as the signal γ (for example, the signal γL1) of the coordinates corresponding to the central time of the predetermined time T1. This processing is similarly performed for each signal β, and thus a defect candidate is extracted from the signal γ calculated for the same coordinate under a predetermined determination condition, and the signal γ of the defect candidate is output.

Second Example of Filter Circuit

Figure 12:
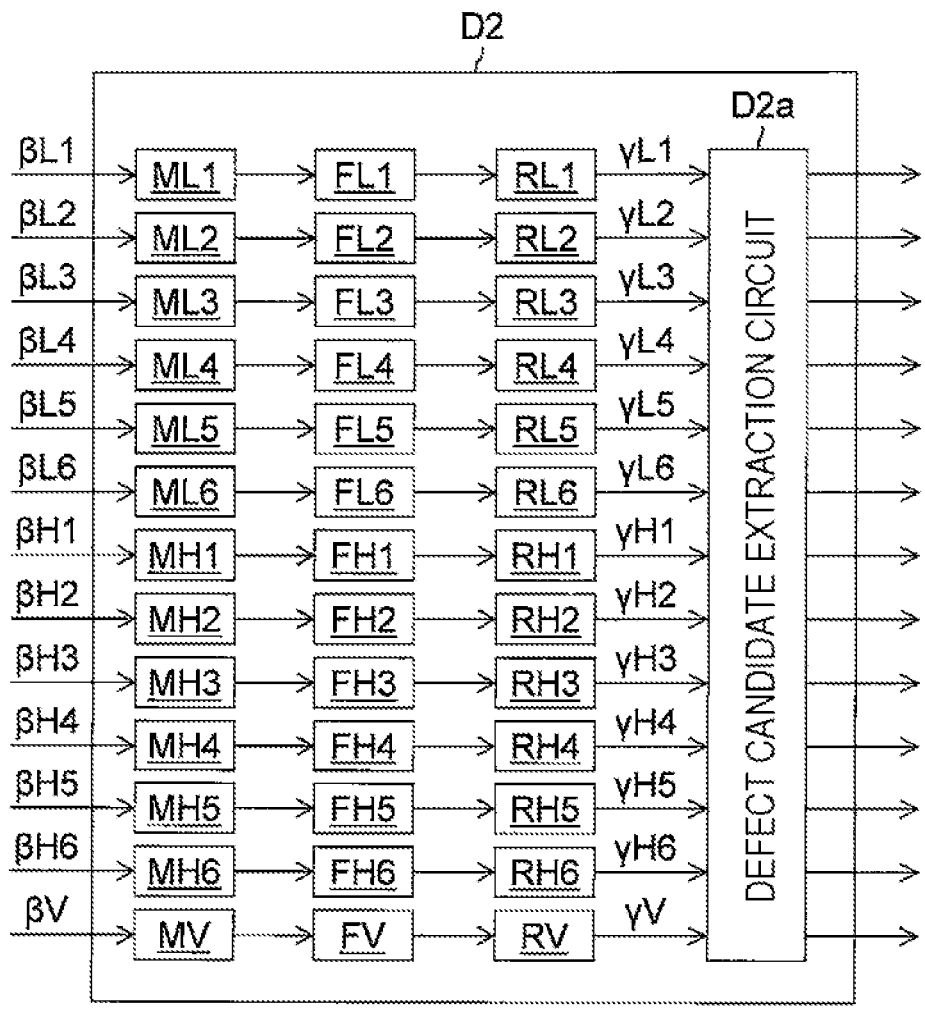
FIG. 12 is a schematic diagram of a second example of the filter circuit of the signal processing device provided in the defect inspection apparatus according to the first embodiment of the present invention.
Figure 13:
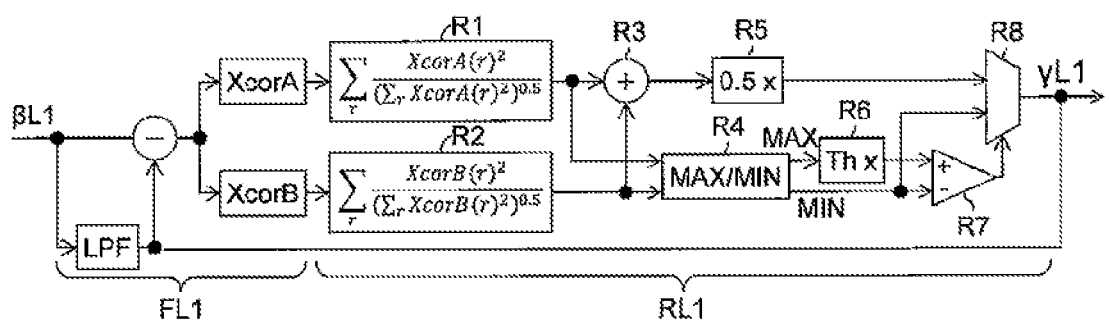
FIG. 13 is a circuit diagram of a filter unit and a noise removal unit of the filter circuit in FIG. 12.
Figure 14:
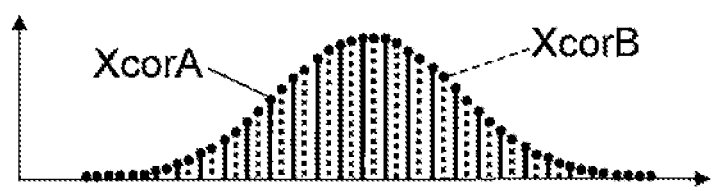
FIG. 14 is a schematic diagram of a kernel used in the filter unit in FIG. 13.

FIG. 12 is a schematic diagram of a second example of the filter circuit D2 of the signal processing device D. FIG. 13 is a circuit diagram of a filter unit and a noise removal unit in the filter circuit D2 of FIG. 12. FIG. 14 is a schematic diagram of a kernel used in the filter unit of FIG. 13. In the case of the filter method as in the first example described with reference to FIG. 11, signal intensity exceeding the first threshold value Thmin or the second threshold value Thmax is required. Thus, even scattered light from actual foreign substance is not extracted as a defect candidate in a case where the amount of the scattered light from actual foreign substance is insufficient. The second example of the filter circuit D2 described with reference to FIGS. 12 to 14 is an example advantageous for detecting a defect having a smaller amount of scattered light than that in the first example.

The filter circuit D2 illustrated in FIG. 12 is configured to include memory units ML1 to ML6, MH1 to MH6, and MV, filter units FL1 to FL6, FH1 to FH6, and FV, noise removal units RL1 to RL6, RH1 to RH6, and BV, and a defect candidate extraction circuit D2a. The memory units ML1, . . . , and MV, the filter units FL1, . . . , and FV, the noise removal units RL1, . . . , and RV, and the defect candidate extraction circuit D2a can be mounted on the same computer, or can be mounted separately on different computers. For example, the processing of the memory units ML1, . . . , and MV and the filter units FL1, . . . , and FV can be performed by a computer attached to the apparatus body, and the processing of the noise removal units RL1, . . . , and RV and the defect candidate extraction circuit D2a can be performed by the server.

The memory units ML1, . . . , and MV are circuits that store and accumulate the corresponding signals β. For example, the signal βL1 is sequentially recorded in the memory unit ML1 and the signal βL2 is sequentially recorded in the memory unit ML2. The filter units FL1, . . . , and FV are circuits that divide the signal β for a predetermined time, which has been recorded in the corresponding memory unit M into two channels and performs cross-correlation calculation with the illumination profile. The noise removal units RL1, . . . , and RV are circuits that determine noise such as electrical noise or shot noise, based on a deviation between two components obtained by the cross-correlation calculation and determines the signal γ to be output.

Here, specific processing for individual signals in the filter circuit D2 will be described below focusing on the individual signals of the constituent signals of the first signal group output from the signal integration circuit D1. In the following description, processing performed by the filter unit FL1 and the noise removal unit RL1 for the signal βL1 will be described, but processing performed by the filter units FL2, . . . , and FV and the noise removal units RL2, . . . , and RV for the other signals βL2, . . . , and βV is similar.

As illustrated in FIG. 13, the filter unit FL1 reads the signal BL1 recorded in the memory unit ML1 in chronological order, and extracts a high frequency component of each signal. In FIG. 13, a configuration in which a low frequency component of the signal βL1 is extracted by an LPF (low pass filter), and the extracted low frequency component is subtracted from the base signal βL1 to extract a high frequency component is exemplified, but the circuit configuration can be appropriately changed. The signal βL1 obtained by cutting the low frequency component is alternately distributed in chronological order in the filter unit FL1 and separated into two channels.

The signal βL1 distributed to the two channels is filtered by cross-correlation calculation with the corresponding kernel. The kernel used for the cross-correlation calculation is data corresponding to the illumination profile of the illumination spot BS as illustrated in FIG. 14. A kernel XcorA for a first channel and a kernel XcorB for a second channel are prepared. The constituent data of the kernels XcorA and XcorB corresponds to data obtained by extracting the data of the illumination profile in the s1 direction of the illumination spot BS at an interval of two sampling periods of the detection signal. When the kernels XcorA and XcorB are superimposed, the signal waveform illustrated in FIG. 11 is obtained. The signal βL1 distributed to the first channel is cross-correlated with the kernel XcorA, and the signal βL1 distributed to the first channel is cross-correlated with the kernel XcorB. Values sequentially calculated in the first channel and the second channel are recorded in the memory as necessary and output to the noise removal unit RL1. The filter unit FL1 performs the processing up to this.

The noise removal unit RL1 compares two component values obtained by performing the filter processing on the two channels in the filter unit FL1, with each other. When the difference between the two component values is more than the setting value, the larger value of the two component values is removed and the smaller value is selected as the signal γL1 constituting the second signal group. When the difference between the two component values is less than the setting value, the average value of the two component values is selected as the signal γL1. The selected signal γL1 is output from the noise removal unit RL1 and input to the defect candidate extraction circuit D2a. At this time, the low frequency component separated from the signal βL1 by the LPF may be added to the signal γL1.

Describing the processing of the noise removal unit RL1 with reference to FIG. 13, calculators R1 and R2 calculate the respective values as follows from the component values obtained by the filter processing of the filter unit FL1.

$$\Sigma_r \{XcorA(r)^2 / \sqrt{(\Sigma_r XcorA(r)^2)}\} \quad \text{(Expression 1)}$$

$$\Sigma_r \{XcorB(r)^2 / \sqrt{(\Sigma_r XcorB(r)^2)}\} \quad \text{(Expression 2)}$$

In a case where the sample 1 is scanned in the spiral trajectory as illustrated in FIG. 2, scanning lines for two cycles of the r-th week and the (r+1) th cycle cross the typical minute defects. When the spiral pitch is set more finely, more scan lines cross the defect. In a case where If he number of scanning lines crossing the defect is two, the component values in the same θ coordinate output from the filter unit FL1 for the same defect are two for each of the two channels. (Expression 1) and (Expression 2) mean resultants obtained by adding a plurality of component values in the same 0 coordinate output from the filter unit FL1 for the same defect with a gain in each channel. The range of the r coordinate to be added in (Expression 1) and (Expression 2) can be set to the length of the illumination spot BS in the s2 direction (for example, the beam width 11 in FIG. 5).

The values calculated by the calculators R1 and R2 are input to an adder R3 and a comparator R4. The two values input from the calculators R1 and R2 to the adder R3 are summed, and the average value of the values obtained by being further multiplied by 0.5 by the multiplier R5 is input to a selector R8. The average value is proportional to the signal $\beta$L1. On the other hand, magnitude of the two values input from the calculators R1 and R2 to the comparator R4 is determined. The larger value (maximum value) and the smaller value (minimum value) are identified and output. The maximum value is input from the comparator R4 to a multiplier R6, and is multiplied by a threshold value Th (0<Th<1) by the multiplier R6. The resultant is input to an amplifier R7. The minimum value is input from the comparator R4 to the selector R8 and the amplifier R7. The amplifier R7 subtracts the minimum value from the value input from the multiplier R6. When the difference takes a positive value, the amplifier R7 amplifies the difference, and outputs the amplified difference to the selector R8 as a control signal. The selector R8 selects the minimum value input from the comparator R4 when the control signal is input, and selects the average value input from the multiplier R5 when the control signal is not input. Then, the selector R8 outputs the selected signal as the signal $\gamma$L1.

As described above, when a difference between the two values calculated in the two channels is equal to or more than the value set by the threshold value Th, and the minimum value of the two values is output as the signal $\gamma$L1. When the difference between the two values is not equal to or more than the value set by the threshold value Th, the average value of the two values is output as the signal $\gamma$L1. For example, when the values calculated in the two channels in the filter unit FL1 are based on the scattered light from the sample 1, the magnitudes of the two values are expected to be similar. The same applies to the values calculated by the calculators R1 and R2. Therefore, when the difference between the values calculated by the calculators R1 and R2 is equal to or less than the setting value, it can be determined that the signal $\beta$L1 set as the base of the calculation is a signal based on the scattered light from the sample 1, and the average value of the values calculated by the calculators R1 and R2 can be handled as the signal $\gamma$L1. On the other hand, when the values calculated in the two channels in the filter unit FL1 are largely affected by noise, a difference occurs between the two values, and a difference between the values calculated by the calculators R1 and R2 is more than the setting value. In this case, by handling the minimum value of the values calculated by the calculators R1 and R2 as the signal $\gamma$L1 with ignoring the maximum value, the influence of the noise is suppressed.

Figure 15:
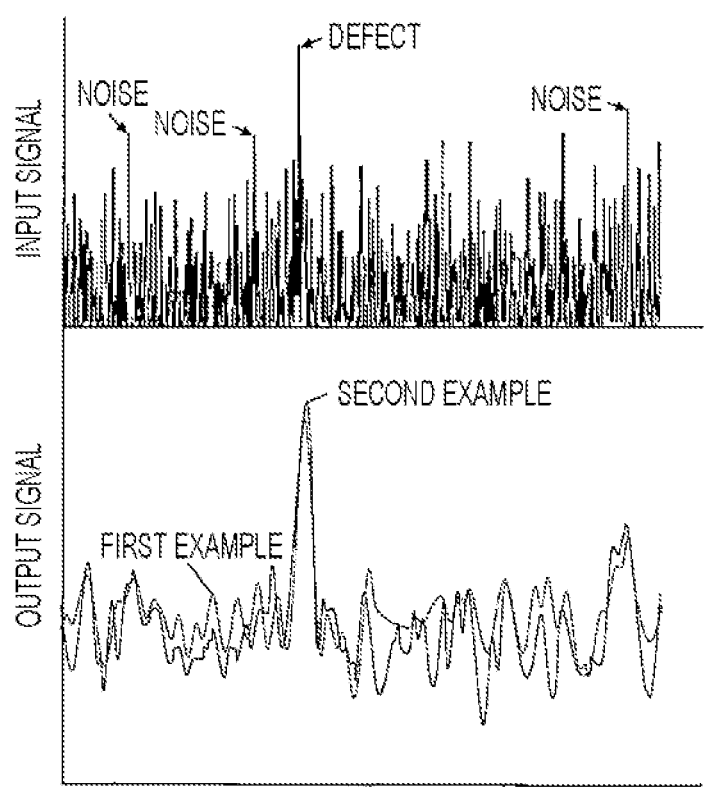
FIG. 15 is a diagram illustrating a difference in signals output in response to the same input signal between the first example in FIG. 11 and the second example in FIGS. 12 to 14.

FIG. 15 is a diagram illustrating a difference in signals output in response to the same input signal between the first example in FIG. 11 and the second example in FIGS. 12 to 14. The upper diagram of FIG. 15 illustrates the signal $\beta$ input to the filter circuit D2, and the lower diagram illustrates the signal $\gamma$ calculated by the filter circuit D2. In the upper diagram of FIG. 15, the signal based on the defect has only the largest peak, and the other peaks are all noise. As illustrated in the lower diagram, the signal based on the defect is clarified in both the first example and the second example, but there is a difference in the output characteristic of the signal $\gamma$ between the first example and the second example. The first example and the second example can be selected and adopted in accordance with the difference in characteristic. As described above, under the condition that the amount of scattered light is insufficient, a favorable result is expected in the second example as compared with the first example in FIG. 11, from the viewpoint of defect detection accuracy.

Defect Candidate Extraction Circuit of Filter Circuit

Figure 16:
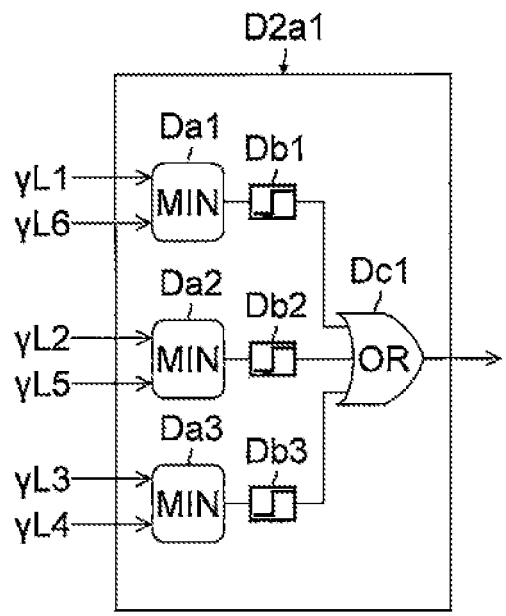
FIG. 16 is a logic circuit diagram of a first defect candidate extraction circuit of the signal processing device provided in the defect inspection apparatus according to the first embodiment of the present invention.
Figure 17:
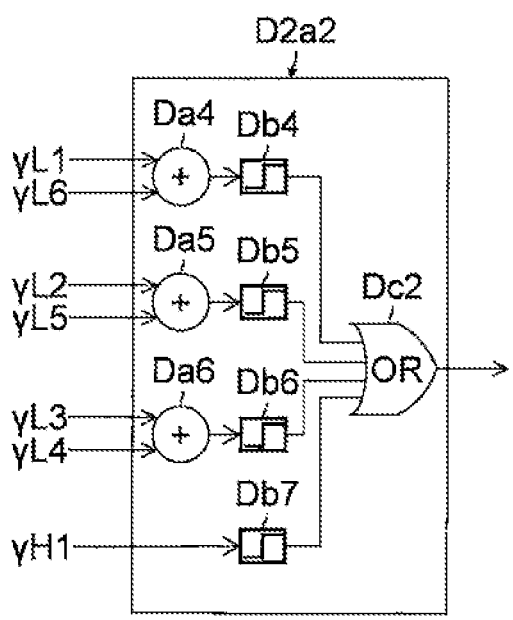
FIG. 17 is a logic circuit diagram of a second defect candidate extraction circuit of the signal processing device provided in the defect inspection apparatus according to the first embodiment of the present invention.

FIG. 16 illustrates a first defect candidate extraction circuit D2$a$1 of the filter circuit D2. FIG. 17 illustrates a second defect candidate extraction circuit D2$a$2. The defect candidate extraction circuit D2$a$1 illustrated in FIG. 16 is a circuit for extracting a signal that is a candidate for a defect (DOI: Defect of Interest, below) to be detected. The defect candidate extraction circuit D2$a$1 is configured in accordance with the detection characteristic of the DOI, so as to extract a signal that is a candidate for the DOI. The defect candidate extraction circuit D2$a$2 illustrated in FIG. 17 is a circuit configured to extract signals for a wide range of types of defects including not only the DOI to be detected but also a defect not to be detected (nuisance below). The defect inspection apparatus is required to have performance of detecting the DOI by accurately distinguishing nuisance, wafer roughness, shot noise, and the like from each other. The defect inspection apparatus 100 can have a configuration in which at least the first defect candidate extraction circuit D2$a$1 among the defect candidate extraction circuits D2$a$1 and D2$a$2 is implemented as the defect candidate extraction circuit D2$a$ or both the defect candidate extraction circuits D2$a$: and D2$a$2 are implemented.

First Defect Candidate Extraction Circuit

Figure 18:
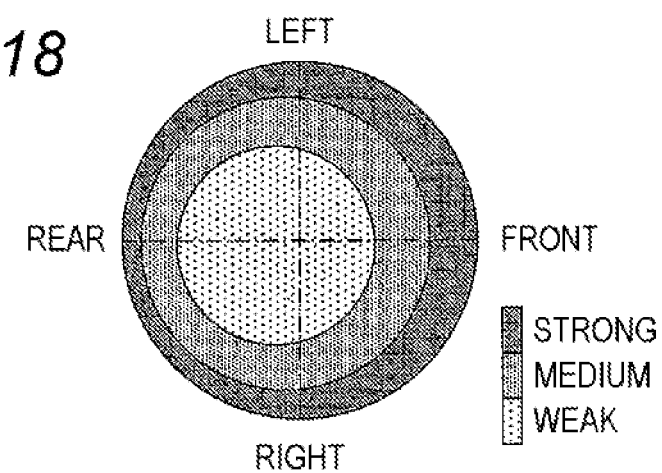
FIG. 18 is a top view illustrating light intensity distribution of scattered light incident when a minute defect is illuminated on a hemispherical surface described with reference to FIG. 7.

The first defect candidate extraction circuit D2$a$1 is configured to intend extraction of a signal caused by the DOI by appropriately distinguishing the signal from a signal caused by the nuisance, the wafer roughness, the noise, and the like. For example, the DOI is assumed to be a minute dusty foreign substance generated during the manufacturing process, and the nuisance is assumed to be a scratch, a polishing induced defect (PID), or the like generated in a previous polishing process. The circuit illustrated in FIG. 16 is an example of a logic circuit configured for the purpose of suppressing the detection of the PID which is the nuisance and detecting the dusty foreign substance that is the DOI. FIG. 18 illustrates a top view illustrating light intensity distribution of scattered light incident when a typical minute foreign substance is illuminated on the hemispherical surface described with reference to FIG. 7. As illustrated in FIG. 18, high isotropy is assumed as the characteristic of scattered light scattered by the DOI, and it is expected that illumination scattered light from the DOI is detected to the same extent not only in one of the left and right spaces but also in both the left and right spaces. In addition, since the DOI is a minute foreign substance, scattered light to a high angle region is not assumed. Therefore, the circuit of FIG. 16 has a configuration in which only the signals $\gamma$L1 to $\gamma$L6 based on the low-angle scattered light are used for determination of the DOI candidates.

Specifically, in the example of FIG. 16, the defect candidate extraction circuit D2$a$1 is configured by using minimum value selectors Da1 to Da3, binarization processors Db1 to Db3, and an OR circuit Dc1. The signals $\gamma$L1 and $\gamma$L6 are input to the minimum value selector Da1, and the minimum value of the signals $\gamma$L1 and $\gamma$L6 is input from the minimum value selector Da1 to the binarization processor Db1. When the minimum value input to the binarization processor Db1 is equal to or more than a setting value, a signal is input from the binarization processor Db1 to the OR circuit Dc1. When the minimum value input to the binarization processor Db1 is less than the setting value, no signal is input from the binarization processor Db1 to the OR circuit Dc1. The signals γL1 and γL6 are signals based on the scattered light scattered in the low-angle backward bilaterally symmetrical regions L1 and L6 in FIG. 10. The fact that the minimum value is equal to or more than a predetermined value means that a predetermined amount or more of scattered light has been scattered to both the low-angle backward left and right sides, and satisfies the determination condition of scattered light scattered by the DOI.

Similarly, the signals γL2 and γL5 corresponding to the low-angle side bilaterally symmetrical regions L2 and L5 are input to the minimum value selector Da2, and signals γL3 and γL4 corresponding to the low-angle forward bilaterally symmetrical regions L3 and L4 are input to the minimum value selector Da3. The minimum value of the signals γL2 and γL5 is input from the minimum value selector Da2 to the binarization processor Db2, and the signal is input from the binarization processor Db2 to the OR circuit Dc1 only in a case where the minimum value of the signals γL2 and γL5 is equal to or more than the setting value. The minimum value of the signals γL3 and γL4 is input from the minimum value selector Da3 to the binarization processor Db3, and the signal is input from the binarization processor Db3 to the OR circuit Dc1 only in a case where the minimum value of the signals γL3 and γL4 is equal to or more than the setting value. In a case where the signal is input from at least one of the binarization processors Db1 to Db3, the OR circuit Dc1 extracts and outputs the second signal group serving as the base of the signal, as a DOI candidate signal.

Second Defect Candidate Extraction Circuit

The second defect candidate extraction circuit D2a2 is configured to extract not only a signal caused by the DOI but also a signal caused by the nuisance. A signal not caused by a defect, for example, a signal or noise caused by wafer roughness may be extracted. The circuit illustrated in FIG. 17 is a configuration example of a logic circuit therefor. Differing from the circuit of FIG. 16 in which the detection target is narrowed down to the DOI, the circuit of FIG. 17 has a configuration using the signal γH1 based on high-angle scattered light in addition to signals γL1 to γL6 based on low-angle scattered light. The signal. γH1 is based on the sum of the detection signals of the scattered light incident on the high-angle regions H1 to H6.

In the example of FIG. 17, the defect candidate extraction circuit D2a2 is configured by using adders Da4 to Da6, binarization processors Db4 to Db7, and an OR circuit Dc2. Specifically, the signals γL1 and γL6 are input to the adder Da4, and the sum of the signals γL1 and γL6 is input from the adder Da4 to the binarization processor Db4. When the sum input to the binarization processor Db4 is equal to or more than a setting value, a signal is input from the binarization processor Db4 to the OR circuit Dc2. When the sum input to the binarization processor Db4 is less than the setting value, no signal is input from the binarization processor Db4 to the OR circuit Dc2. The signals γL1 and γL6 are signals based on the scattered light scattered in the low-angle backward bilaterally symmetrical regions L1 and L6 in FIG. 10. The event in which the sum is equal to or more than a predetermined value is not limited to a case in which a predetermined amount or more of scattered light is scattered to both the low-angle backward left and right sides. Such an event may correspond to many cases, for example, a case in which scattered light of the amount that does not satisfy the predetermined value is scattered to both the left and right sides, a case in which a predetermined amount or more of scattered light is scattered to either the left or right side, or the like. The sum may become equal to or more than a predetermined value due to the influence of noise without being based on scattered light.

Similarly, the signals γL2 and γL5 are input to the adder Da5, and the signals γL3 and γL4 are input to the adder Da6. The sum of the signals γL2 and γL5 is input from the adder Da5 to the binarization processor Db5, and the signal is input from the binarization processor Db5 to the OR circuit Dc2 when the sum is equal to or more than the setting value. The sum of the signals γL3 and γL4 is input from the adder Da6 to the binarization processor Db6, and the signal is input from the binarization processor Db6 to the OR circuit Dc2 when the sum is equal to or more than the setting value. Further, the signal γH1 is input to the binarization processor Db7, and the signal is input from the binarization processor Db7 to the OR circuit Dc2 when the sum is equal to or more than the setting value. In a case where the signal is input from at least one of the binarization processors Db4 to Db7, the OR circuit Dc2 extracts and outputs the second signal group serving as the base of the signal. According to the defect candidate extraction circuit D2a2 of FIG. 17, as compared with the defect candidate extraction circuit D2a1 of FIG. 16, a very large number of signals including scratches and nuisance such as crystal defects are extracted.

By changing the setting of the extraction condition including such a change in the configuration of the logic circuit, it is possible to flexibly change the defect type or the like that can be extracted from the same sample.

Other Examples of DOI

FIG. 18 illustrates light intensity distribution of scattered light incident when a typical minute foreign substance (foreign substance assumed to be spherical) is illuminated. FIG. 16 illustrates a configuration example of the defect candidate extraction circuit D2a1 in which the light intensity distribution is set as the DOI. However, the configuration of the defect candidate extraction circuit D2a1 differs depending on the type of DOI to be detected.

Figure 19:
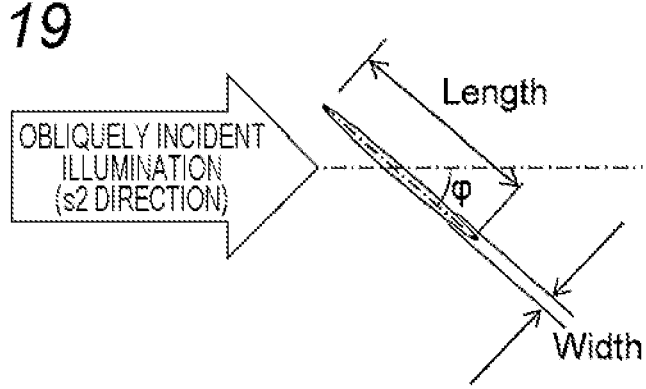
FIG. 19 is a model diagram of a scratch defect.
Figure 20:
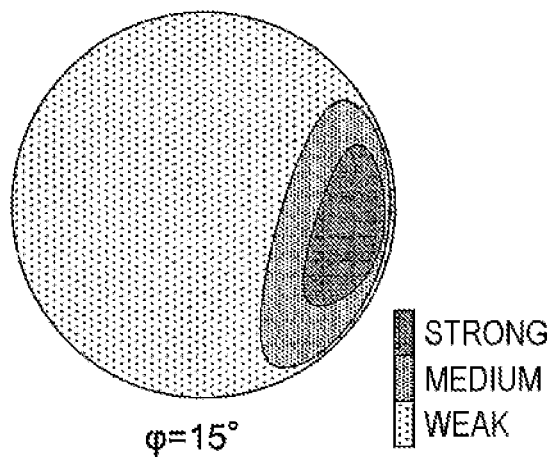
FIG. 20 is a first diagram illustrating, in a top view, light intensity distribution of scattered light incident when a scratch defect is illuminated on the hemispherical surface described with reference to FIG. 7.
Figure 21:
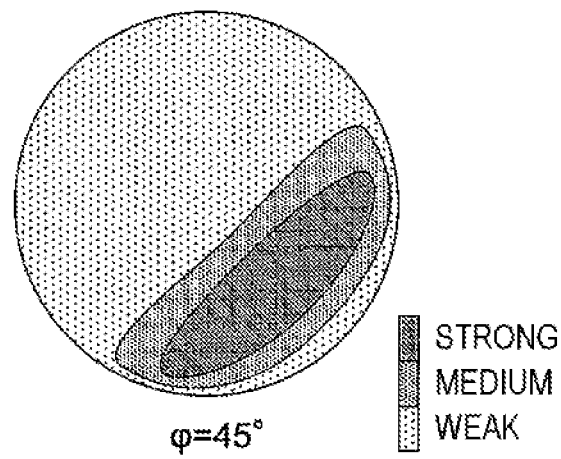
FIG. 21 is a second diagram illustrating, in a top view, the light intensity distribution of the scattered light incident when the scratch defect is illuminated on the hemispherical surface described with reference to FIG. 7.
Figure 22:
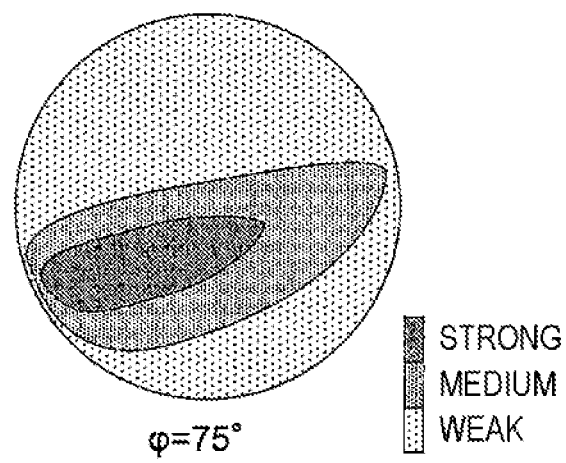
FIG. 22 is a third diagram illustrating, in a top view, the light intensity distribution of the scattered light incident when the scratch defect is illuminated on the hemispherical surface described with reference to FIG. 7.

FIG. 19 is a model diagram of a scratch defect. FIGS. 20 to 22 are diagrams illustrating, in top view, the light intensity distribution of scattered light incident when the scratch defect is illuminated on the hemispherical surface described with reference to FIG. 7. As illustrated in FIG. 19, the scratch defect is a representative example of an anisotropic defect, and has a large length dimension with respect to the width, and is inclined at an inclination angle φ with respect to the illumination direction of obliquely incident illumination. As illustrated in FIGS. 20 to 22, the illumination scattered light from the scratch defect has characteristic of being scattered at different intensities in the left and right directions. FIG. 20 illustrates an example of the light intensity distribution at the inclination angle φ=15°. FIG. 21 illustrates an example of the inclination angle φ=45°. FIG. 22 illustrates an example of the inclination angle φ=75°. Therefore, in a case where the scratch is set as the DOI, a logic circuit that determines asymmetry is configured instead of a logic circuit that determines symmetry in scattered light intensity on the left and right sides as in the circuit of FIG. 16. A circuit in which a minimum value selector, a maximum value selector, and a binarization processor are combined, and a signal is output to the OR circuit Dc1 when the maximum value of the signals γL1 and γL6 is equal to or more than a predetermined value and the minimum value is equal to or less than a predetermined value can be exemplified. Note that shot noise and electric noise are also considered to have no symmetry on the left and right sides, and can also be applied to noise discrimination by adjusting the setting value of the binarization processor.

—Signal Separation Circuit—

Figure 23:
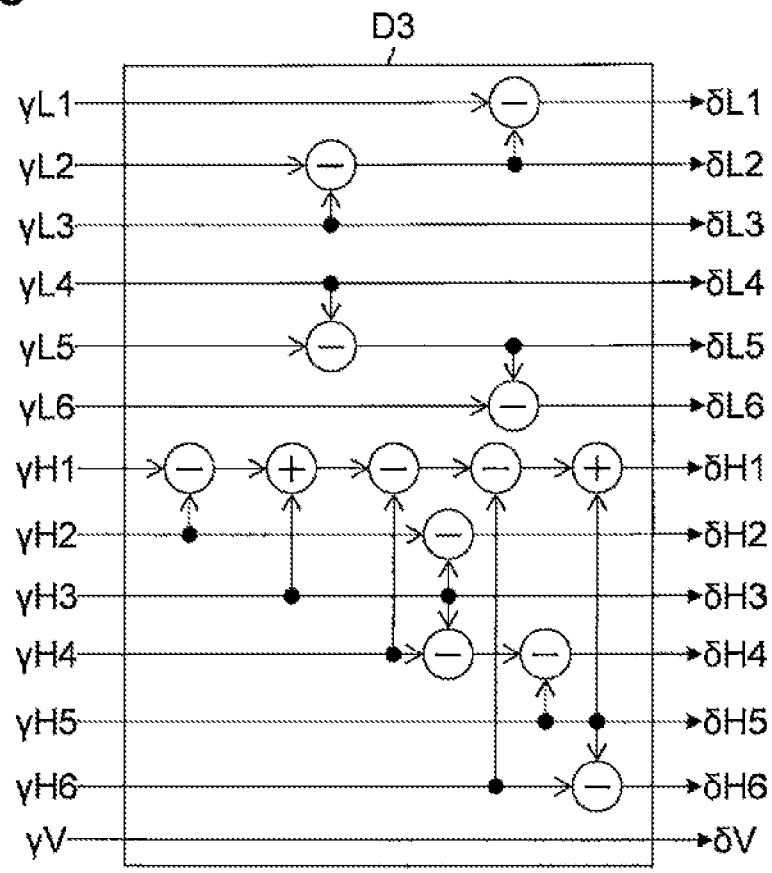
FIG. 23 is a schematic diagram of a signal separation circuit of the signal processing device provided in the defect inspection apparatus according to the first embodiment of the present invention.

FIG. 23 is a circuit diagram of the signal separation circuit D3 of the signal processing device D of FIG. 1. The signal separation circuit D3 generates and outputs, based on the signals γL1, ..., and γV of the second signal group, signals δL1, ..., and δV of a third signal group including a separation signal separated from a signal corresponding to the integrated signal in accordance with a predetermined rule. The output third signal group is recorded in the memory (for example, the memory of the signal processing device D or a memory of a device connected to the signal processing device D). For example, the signal separation circuit D3 generates the separation signal by subtracting at least one other signal (for example, the signal γL2) constituting the second signal group from the signal (for example, the signal γL1) of the first signal group, which corresponds to the integrated signal (for example, the signal βL1). As described above, in the present embodiment, the integrated signal is generated by adding the detection signals on the same right and left sides. Thus, the separation signal is generated by subtracting the detection signals based on the signals constituting the second signal group, which have been condensed in the spaces on the same right and left sides.

Specifically, in the present embodiment, based on the signals γL1 to γL6, γH1 to γH6, and γV of the second signal group, as illustrated in FIG. 23, the signals δL1 to δL6, δH1 to δH6, and δV constituting the third signal group are calculated as follows.

$\delta L1 = \gamma L1(-\gamma L2 - \gamma L3)$: separation signal $\delta L2 = \gamma L2(-\gamma L3)$: separation signal $\delta L3 = \gamma L3$: non-separation signal $\delta L4 = \gamma L4$: non-separation signal $\delta L5 = \gamma L5(-\gamma L4)$: separation signal $\delta L6 = \gamma L6(-\gamma L4 - \gamma L5)$: separation signal $\delta H1 = \gamma H1(-\gamma H2 + \gamma H3 - \gamma H4 + \gamma H5 - \gamma H6)$: separation signal $\delta H2 - \gamma H2(-\gamma H3)$: separation signal $\delta H3 = \gamma H3$: non-separation signal $\delta H4 = \gamma H4(-\gamma H3 - \gamma H5)$: separation signal $\delta H5 = \gamma H5$: non-separation signal $\delta H6 = \gamma H6(-\gamma H5)$: separation signal $\delta V = \gamma V$(non-separation signal)

In the case of the example of FIG. 23, the signals δL1, ..., and δV output from the signal separation circuit D3 corresponds to the detection signals αL1, ..., and αV input to the signal integration circuit D1. The detection signals αL1, ..., and αV are once appropriately integrated for the processing by the filter circuit D2, but it is desirable that the magnitude of the detection signal of each sensor is known in analyzing defects in various feature spaces by defect detection. Therefore, a configuration in which the signal processed by the signal integration circuit D1 is separated after the filter processing is adopted. FIG. 23 illustrates a configuration in which the signals δL1, ..., and δV are fed back to the signals corresponding to the detection signals αL1, ..., and αV, but it is not necessary to completely feed all the integrated signals back to the basic detection signals. For example, a configuration in which the six signals γH1 to γH6 at high angles are output as four signals being the detection signal (αH3+αH4+αH5), the detection signal (αH6+αH1+αH2), the detection signal (αH2+αH3), and the detection signal (αH5+αH5) may be made. The detection signal (αH3+αH4+αH5) corresponds to a high-angle forward integrated signal. The detection signal (αH6+αH1+αH2) corresponds to a high-angle backward integrated signal. The detection signal (αH2+αH3) corresponds to a high-angle right integrated signal. The detection signal (αH5+αH5) corresponds to a high-angle left integrated signal.

—Defect Detection Circuit—

Figure 24:
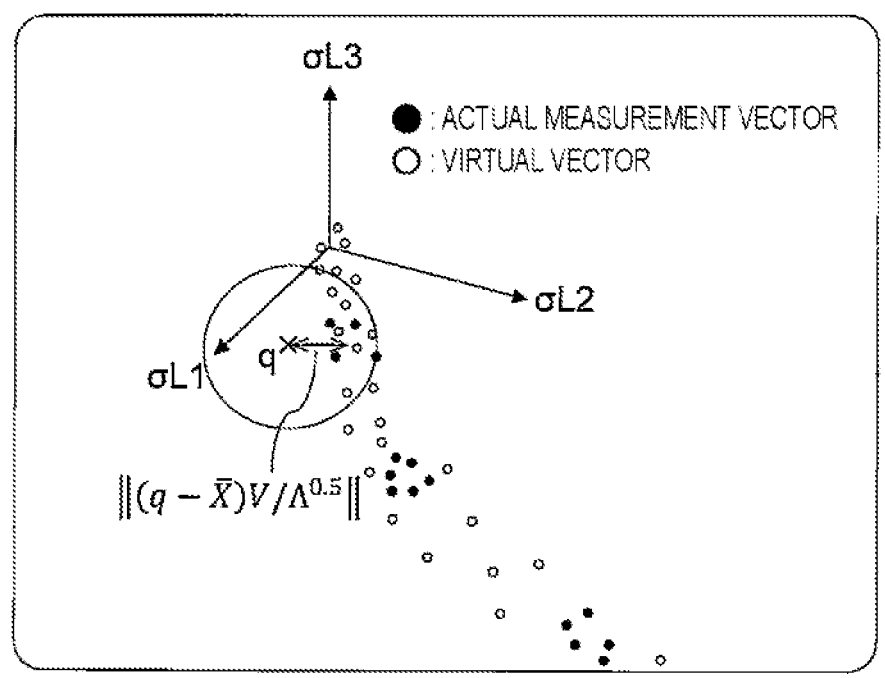
FIG. 24 is an explanatory diagram of an example of a concept of defect determination of a defect detection circuit of the signal processing device provided in the defect inspection apparatus according to the first embodiment of the present invention.

FIG. 24 is an explanatory diagram of an example of a concept of defect determination of the defect detection circuit D4 in the signal processing device D of FIG. 1. The defect detection circuit D4 performs processing of detecting a defect based on signals σL1, ..., and σV (corresponding to a set of detection signals αL1, ..., and αV) of the third signal group output from the signal separation unit D3. Specifically, the distance between the candidate for the DOI and the instruction defect of the DOI is calculated in the feature space, and it is determined whether the defect candidate is the DOI, based on whether the distance is equal to or less than a setting value. In the feature space, the extracted DOI candidate is represented by a feature vector defined by the signals σL1, ..., and σV (coordinates). The instruction defect of the DOI is also represented by a feature vector defined by the signals σL1, ..., and σV (coordinates). For convenience of representation on the paper surface, FIG. 24 illustrates a feature space in which three features of the signals δL1, σL2, and σL3 are taken as coordinate axes. However, in practice, it is determined whether the candidate is the DOI in a feature space of dimensions (13 dimensions in the present example) equal to the number of σL1, ..., and σV. Machine learning such as a Mahalanobis distance (described later), Local Subspace Classifier, 1-class SVM, and Nearest Neighbor can be applied to feature space determination of such one-class classification (determination of whether or not it is a specific DCI). Defect inspection data obtained by determination of the defect detection circuit D4 is recorded in the memory (for example, the memory of the signal processing device D or a memory of a device connected to the signal processing device D).

Note that, in the present specification, a feature vector representing a defect detected based on the detection signals αL1, ..., and αV of the sensors C1 to C13 in the feature space has been described as the "actual measurement vector". The actual measurement vector is defined by a set of the signals σL1, ..., and σV (or detection signals αL1, ..., and αV) related to the detection defect. In addition, a plurality of feature vectors of the instruction defects used for defect determination by the defect detection circuit D4 are stored in the storage device DB for each defect type, and the defect detection circuit D4 performs the defect determination described above with reference to the feature vectors of the instruction defects having the same defect type as the DOI. The feature vector of the instruction defect accumulated in the storage device DB includes a feature vector (to be described later) of a virtual defect generated by the data learning circuit D5 in addition to the actual measurement vector of the defect determined to be the DOI by the defect detection circuit D4. In FIG. 24, a large number of marks represent instruction data of the selected DOI. Among the marks, a black mark represents an actual measurement vector, and a white mark represents a feature vector of a virtual defect simulated by a virtual DOI.

For example, a case where the defect detection circuit D4 determines whether the extracted DO candidate is the DOI, based on the Mahalanobis distance, is considered. In this case, the feature vector of the instruction defect at a point K closest to the feature vector q of the extracted DOI candidate is first selected, and X=[x1, x2, x3 ... xk], the average value of X is set as Xave. Then, the eigenvector matrix V0 and the eigenvalue vector matrix Λ of $(X-Xave)^T(X-Xave)$ are calculated, and the eigenvector matrix $V (=(X-Xave)V0/\sqrt{\Lambda})$ of $(X-Xave)^T(X-Xave)$ is calculated. Finally, the norm $(=(q-Xave)V/\sqrt{\Lambda})$ illustrated in FIG. 24 is calculated. When the norm (distance) is equal to or less than a preset threshold value, it is determined that the extracted DOI candidate is the DOI. When the norm (distance) is more than a threshold value, it is determined that the DOI candidate is not the DOI. By outputting only the DOI and the detection defect, it is possible to realize highly sensitive defect detection in which detection of a nuisance is suppressed. As another implementation method, a flag capable of identifying the determination result may be added to output all the DOI candidates.

—Data Learning Circuit—

Figure 25:
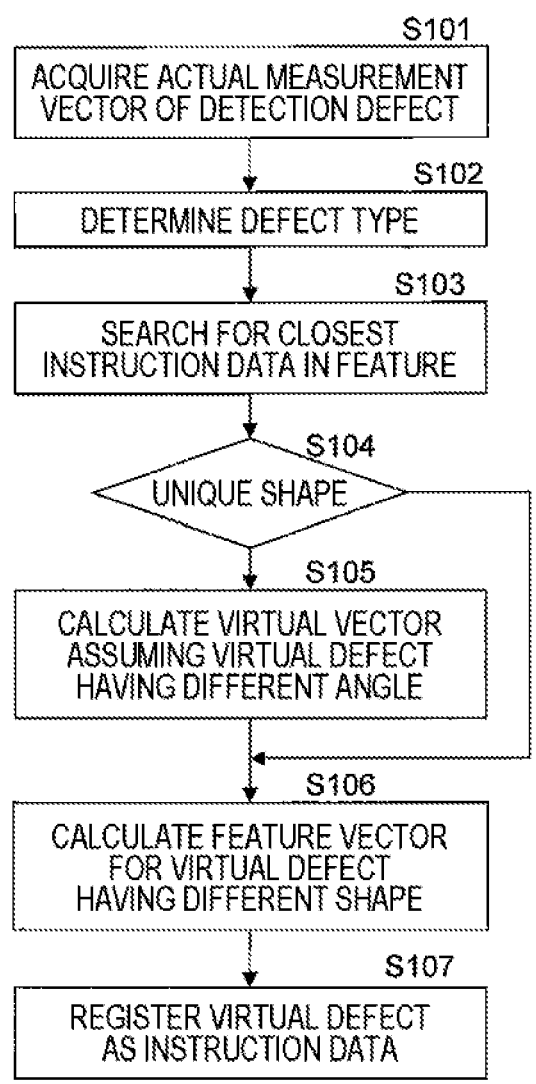
FIG. 25 is a flowchart illustrating a procedure of accumulating defect instruction data by a data learning circuit of the signal processing device provided in the defect inspection apparatus according to the first embodiment of the present invention.

FIG. 25 is a flowchart illustrating a procedure of accumulating instruction data of a defect by the data learning circuit D5. The data learning circuit D5 generates a feature vector of a virtual defect in which the form of the detection defect is changed, from the actual measurement vector of the detection defect based on a plurality of pieces of instruction defect data stored in the storage device DB in the same defect type as the detection defect. The data learning circuit D5 records the feature vector of the virtual defect generated from the actual measurement vector, in the storage device DB as a feature vector of one instruction defect, and accumulates a database of the feature vector for each defect type. The "form" of the defect in the present specification is a concept including the shape (for example, length, width, depth, height, aspect ratio, and the like), the size, the angle, and the like of the defect. The processing of the data learning circuit D5 will be described with reference to FIG. 25.

Step S101

Figure 26:
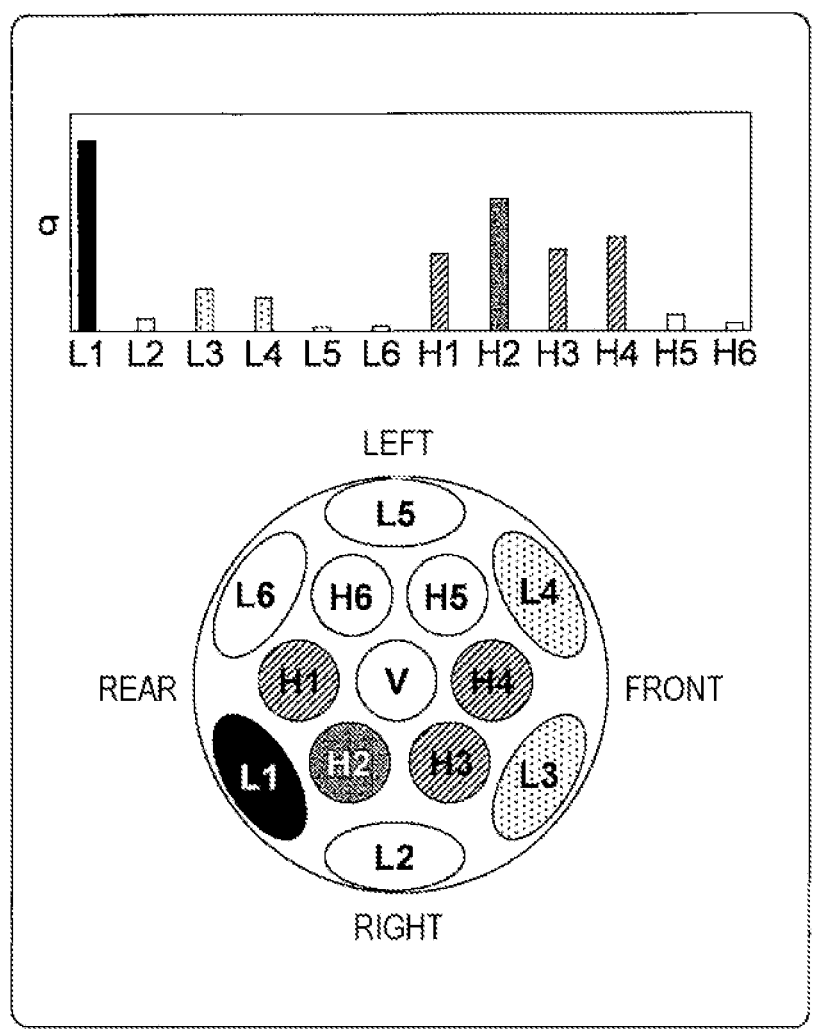
FIG. 26 is a diagram for explaining an example of a data set representing a detection defect.

First, in Step S101, the data learning circuit D5 acquires an actual measurement vector of the detection defect. The actual measurement vector acquired here is, for example, a set (for example, the signals σL1, ..., and σV, αL1 ... αV, or the like) of defect signals (numerical values) determined to be the DOI by the defect detection circuit D4. FIG. 26 is an example of a data set of the third signal group (signals σL1, ..., and σH6) representing the detected DOI. In this example, the signal σV is omitted.

Step S102

When the actual measurement vector of the detection defect is acquired, the data learning circuit D5 determines the defect type for the acquired actual measurement vector. Here, a method of determining the defect type from the scattered light distribution can be exemplified. For example, in the case of the detection defect illustrated in FIG. 26, the scattered light distribution is biased to the right region, there is no symmetry, and the feature of the anisotropic defect appears. Furthermore, the scattered light intensity to the lower right rear region L1 is particularly strong. Since a linear defect has a tendency in which the illumination scattered light is scattered in the short diameter direction of the linear defect, it can be determined that φ (FIG. 19) is the linear defect (for example, a scratch) of about 75° in the case of the detection defect of FIG. 26. A granular defect is characterized by the symmetry of the scattered light distribution, but, as the particle diameter increases, the influence of the variation in shape on the scattered light distribution tends to increase, and the symmetry of the scattered light distribution tends to be weakened. Such correlation data between the scattered light distribution and the defect type is set in advance, and the defect type can be determined such that the detection defect is, for example, a particulate defect type or a linear defect type such as a scratch. In the case of the linear defect, the approximate angle φ can also be determined from the direction in which scattering is performed with the strong scattered light intensity. In addition, the size such as the particle diameter and the length of the detection defect can also be estimated from the signal intensity of each signal.

Note that, the determination of the defect type is not limited to the method based on the scattered light distribution. For example, a method of determining the defect type from the inspection result of the DR-SEM can also be applied. That is, the inspection image of the sample 1 by the DR-SEM can be read, and the defect type of the detection defect can be determined from the image at the same position as the defect data on the surface of the sample 1.

Step S103

After determining the defect type, the data learning circuit D5 searches the pieces of data accumulated in the storage device DB for the instruction defect closest to the actual measurement vector of the detection defect within a feature section defined by the signals σL1, ..., and σV. That is, the instruction defect in which the feature represented by the signals σL1, ..., and σV is closest to the detection defect is selected. The instruction defect searched here may be a detection defect determined to be the DCI in the past or a virtual defect.

Step S104

Then, the data learning circuit D5 determines whether the detection defect has a unique shape (for example, whether the detection defect is a defect having strong anisotropy such as a scratch), and virtually simulates a virtual defect from the detection defect with a change in form in response to the determination. Then, the data learning circuit D5 proceeds to a feature vector generation procedure. As an example, for example, a method of determining that the detection defect has a unique shape in a case where the size of the detection defect in a specific direction is estimated to be equal to or more than a setting value (for example, ¼ of the wavelength of the illumination light) can be exemplified. In a case where the detection defect has a unique shape, the next step S105 is performed, and if not, Step S106 is performed.

Step S105

In a case where the detection defect has a unique shape with poor symmetry, the data learning circuit D5 calculates a feature vector (set of signals δL1, ..., and δV) in a case where the detection defect rotates around the normal line of the sample 1. That is, by changing the illumination azimuth of the illumination optical system A or the angle of the defect with respect to the polarization direction of the illumination light, the virtual defect in which the form of the detection defect is changed is simulated, and the feature vector thereof is generated. As an example, a method in which an actual measurement vector is affine-transformed, and a mirror image, a rotated image, or the like of a detection defect is used as a virtual defect is exemplified. However, when the relationship between the illumination direction and the direction of the defect is different even though the defect has the same shape and the size, a similar tendency appears in the scattered light distribution, but the intensity of the illumination scattered light incident on each region L1, . . . , or V changes. Therefore, based on the instruction defect data accumulated in the storage device DB in the same defect type as the detection defect, the change rate of the scattered light intensity in each direction depending on the direction of the defect is calculated, and the feature vector of the virtual defect is generated by multiplying each signal of the feature vector after the affine transformation by each change rate. In addition, the above method is not limited to the method using the affine transformation. A method of applying a change in the feature vector due to the angle of the instruction defect accumulated in the storage device DB in the same defect type as the detection defect to the actual measurement vector of the detection defect and calculating the result of the application as the feature vector of the virtual defect in which the detection defect is rotated can also be exemplified.

Step S106

In addition, the data learning circuit D5 calculates the feature vector of the virtual defect in which the form (here, the defect size) is changed with respect to the detection defect which has not been determined to have the unique shape in Step S104 or the virtual defect (including the base detection defect having the unique shape) calculated in Step S105. As an example, in a case where the detection defect is a granular defect, a defect having a defect size (for example, particle diameter) different from the detection defect is handled as a virtual defect having a different shape. In this case, the change rate of the signal intensity due to the size change is calculated as a gain based on the instruction defect data accumulated in the storage device DB in the same defect type as the detection defect, and the feature vector of the virtual defect is generated by multiplying each signal of the feature vector by the gain. When the granular defect is sufficiently smaller than the wavelength of the illumination light in any of XYZ directions, a method of multiplying the volume by the sixth power on the assumption of Rayleigh scattering can also be adopted. In addition, in a case where the detection defect is a linear defect such as a scratch, a defect having a length, a width, and a depth different from the detection defect is handled as a virtual defect having a different shape. In this case, the change rate of the signal intensity due to the change in length, width, and depth is calculated as a gain based on the instruction defect data accumulated in the storage device DB in the same defect type as the detection defect, and the feature vector of the virtual defect is generated by multiplying each signal of the feature vector by the gain. Note that, in a case where both the width and the depth of the linear defect are equal to or less than the wavelength of the illumination light, the length of the defect and (width x depth) may be handled as variables.

Step S107

After calculating the feature vector of the virtual defect in Step S106, the data learning circuit D5 accumulates the calculated feature vector of the virtual defect as the feature vector of the instruction defect in the storage device DB in association with data such as the defect type, the size, the direction, the length, the width, and the depth.

—Standard Sample (Option)—

Figure 27:
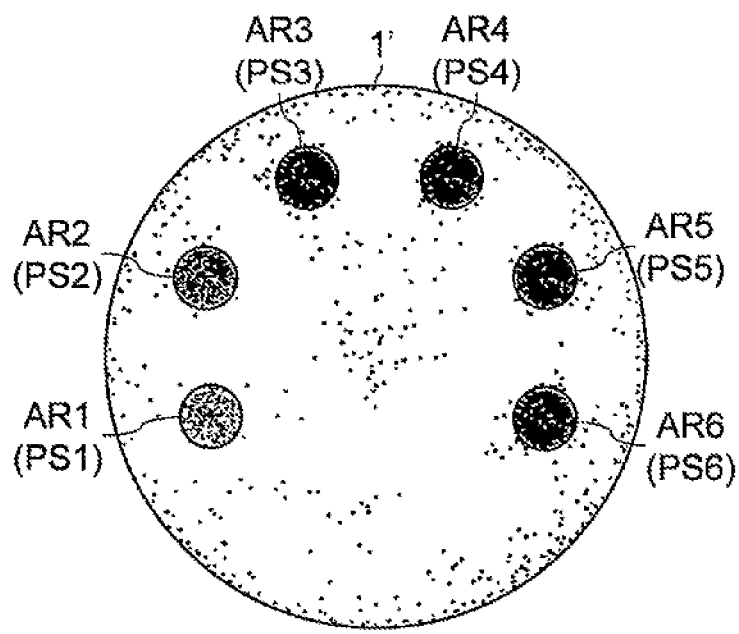
FIG. 27 is a diagram illustrating a standard sample applicable to generation of a feature vector of a virtual defect.

FIG. 27 is a diagram illustrating a standard sample applicable to generation of a feature vector of a virtual defect. In a standard sample 1' in FIG. 27, standard defects (for example, standard particles) having a known size are scattered in a predetermined region for each size. The standard defects scattered on the sample surface have signal intensity distribution similar to that of the dusty foreign substance on the sample surface, which is often required to be detected as the DOI. Since it is not easy to acquire a large amount of signal data of dusty foreign substances of various sizes, the feature vector of the instruction defect is calculated based on the signal intensity obtained by the standard defect. When the size is constant, it is easy to prepare a granular defect for each size. Thus, it is possible to create the standard sample 1' having a plurality of standard defects having known sizes and positions and different sizes as illustrated in FIG. 27, by dividing the region for each size and scattering the standard defects. In inspecting the standard sample 1' in this manner, for example, an image of the standard sample of FIG. 27 is displayed as a wafer map on the monitor E3, and regions AR1 to AR6 for DCI detection are designated in the user interface E2 as illustrated in FIG. 27. For example, a region where a standard defect having a particle diameter PS1 is detected is designated as a region AR1. The region AR1 is set as small as possible within a range in which the number of standard defects having the particle diameter PS1 is maximized. Similarly, the regions where the standard defects having the particle diameters PS2 to PS6 are detected are designated as regions AR2 to AR6, respectively. The particle diameter of the defect is set to satisfy, for example, PS1<PS2<PS3<PS4<PS5<PS6.

By inspecting such a standard sample 1', it is possible to efficiently acquire the feature vector of the instruction defect in a large amount for a specific defect type by associating information such as a known size and shape with the feature vector of the standard defect detected in each of the regions AR1 to AR6. In addition, by assuming a virtual defect (for example, a defect having a size different from the particle diameters PS1 to PS6) from the actual measurement vector obtained from the standard sample 1' and generating a feature vector as described above, it is possible to further obtain a larger amount of instruction vectors for this defect type. The feature vectors of the instruction defects stored in the storage device DB can include not only a plurality of actual measurement vectors acquired by inspecting the standard sample 1' in this manner, but also a plurality of feature vectors calculated by the signal processing device D for a virtual defect having a size different from the standard defect (described later).

In addition, it is possible to accumulate a feature vector of the detection defect detected in the defect inspection performed using the defect inspection apparatus 100 in the semiconductor manufacturing process every day and further generate a feature vector of a virtual defect from the detection defect. Therefore, in a case where data is sufficiently obtained for each defect type in the semiconductor manufacturing process, it is not necessarily required to use the standard sample 1'.

—Generation of Feature Vector of Virtual Defect Having Virtual Granular Shape—

One of typical DOIs detected by the defect inspection apparatus 100 is dusty foreign substance adhering to a sample during the operation of a process apparatus in a semiconductor manufacturing process. It is important to detect only the dusty foreign substance as the DOI with high accuracy in order to evaluate the process apparatus. The typical dusty foreign substance is sufficiently small with respect to the wavelength of the illumination light. Thus, even though the scattered light distribution for the dusty foreign substance is considered as the scattered light distribution as illustrated in FIG. 18 for the spherical foreign substance, a large deviation does not occur with respect to the entity. Therefore, it is possible to easily and sufficiently obtain the instruction data regarding the dusty foreign substance from the standard sample on which the standard particles are scattered. However, in a case where the standard particles are used, the defect size is discrete. In addition, it is technically difficult to scatter defects having a particle diameter smaller than a predetermined size. Therefore, as described in the description of FIG. 27, by obtaining a large number of feature vectors for virtual defects having sizes different from the standard defect, it is possible to enrich instruction defect data for dusty foreign substance.

Figure 28:
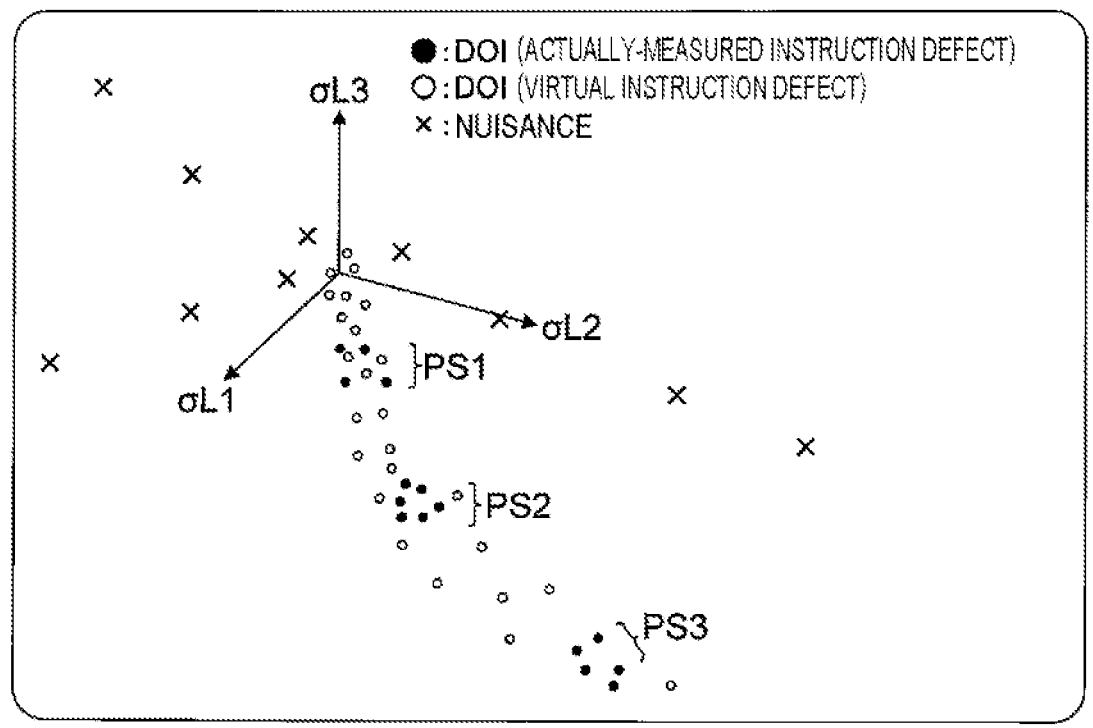
FIG. 28 is a diagram for explaining an example of a concept of generating a feature vector of a virtual defect of the same defect type having a particle diameter for which a feature vector is not obtained in a case where a plurality of feature vectors are obtained for each of granular defects having different particle diameters.

FIG. 28 is a diagram for explaining an example of a concept of generating the feature vector of the virtual defect of the same defect type having a particle diameter for which a feature vector is not obtained in a case where a plurality of feature vectors are obtained for each of granular defects having different particle diameters. In the case of the granular defect, when the particle diameter is sufficiently small with respect to the wavelength of the illumination light, the illumination scattered light is isotropically scattered, but forward scattering becomes stronger as the particle diameter cannot be ignored more with respect to the wavelength of the illumination light. When the particle diameter increases, a difference in scattered light distribution due to the shape also occurs. This variation can be regarded as a probability process in which the amount of scattered light from the defect takes Poisson distribution, and thus is proportional to the 0.5 power of the amount of the scattered light. Therefore, the data learning circuit D5 can be configured to estimate the variation in the feature vector of the virtual defect in the same defect type as the detection defect by calculation based on the instruction defect data accumulated in the storage device DB. Further, the data learning circuit D5 can be configured to generate a plurality of feature vectors of the virtual defect for the same defect type as the detection defect based on the variation calculated with the actual measurement vector of the detection defect by the data learning circuit D5, give a class distribution in association with the defect type, and record the class distribution in the storage device DB.

Specifically, the expected value x(s) of the feature vector of the virtual defect having the particle diameter s is calculated by the following Expression (3) or Expression (4). The expected value Var(s) of the variation in the feature vector of the virtual defect having the particle diameter s is calculated by Expression (5). The feature vector of the virtual defect is calculated from x(s) and Var(s). x(s) calculated by Expression (3) is a value for the particle diameter s (PS1 <s<PS2, PS2<s<PS3, and the like) of interpolation. x(s) calculated by Expression (4) is a value for the particle diameter s (s<PS1, s>PS6, and the like) of extrapolation.

$$x(s)=\{((S+\Delta S)^6-s^6)x(S)+(s^6-S^6)x(S+\Delta S)\}/\{(S+\Delta S)^6-S^6\}$$ (Expression 3)

$$x(s)=(s^6)\times(S)/S^6$$ (Expression 4)

$$\mathrm{Var}(s)=\{S+\Delta S)^6-s^6)\mathrm{Var}(S)+(s^6-S^6)\mathrm{Var}(S+\Delta S)\}/\{(S+\Delta S)^6-S^6\}$$ (Expression 5)

Where S is a particle diameter of a plurality of instruction defects discretely given, x(S) is an average value of feature vectors of a plurality of instruction defects having the particle diameter S, and Var(S) is a variation in feature vectors of instruction defects having the particle diameter S.

The method of calculating the feature vector of the instruction defect of the DOI based on the signal of the scattered standard defects described above can also be applied to the case of generating nuisance instruction data.

In semiconductor manufacturing, a semiconductor wafer is manufactured through a large number of processes, but in many cases, the DOI is not a defect generated in the previous process but a defect generated in the last process. In the semiconductor manufacturing process, since it is common to perform manufacturing by laminating thin films, in many cases, defects in the previous process are foreign substances in the thin film. Therefore, it is required to separate defects on the thin film and defects in the film from each other. In this case, the DOI is a foreign substance on the membrane and nuisance is a defect in the film. Therefore, when a thin film is formed on a standard defect sample scattered on the sample, it is possible to create a standard sample having a defect in the film. In a manner similar to that in the case of the DOI, an instruction vector is generated from the signal of the defect candidate detected in the region in which the standard defect samples are scattered, and the generated instruction vector is used as nuisance instruction data.

In addition, as another method, there is also a method in which a sample is inspected without scattering a standard defect to detect a defect, a thin film is formed on the sample, the sample is inspected again, and instruction data is generated from a signal light amount of the sample in which the defect is detected at the same coordinates. When the defect detected before formation of the thin film is detected again after formation of the thin film, it can be determined that the defect is a defect in the film, and the defect can be registered as nuisance instruction data.

—Generation of Feature Vector of Virtual Defect having Virtual Unique Shape—

Figure 29:
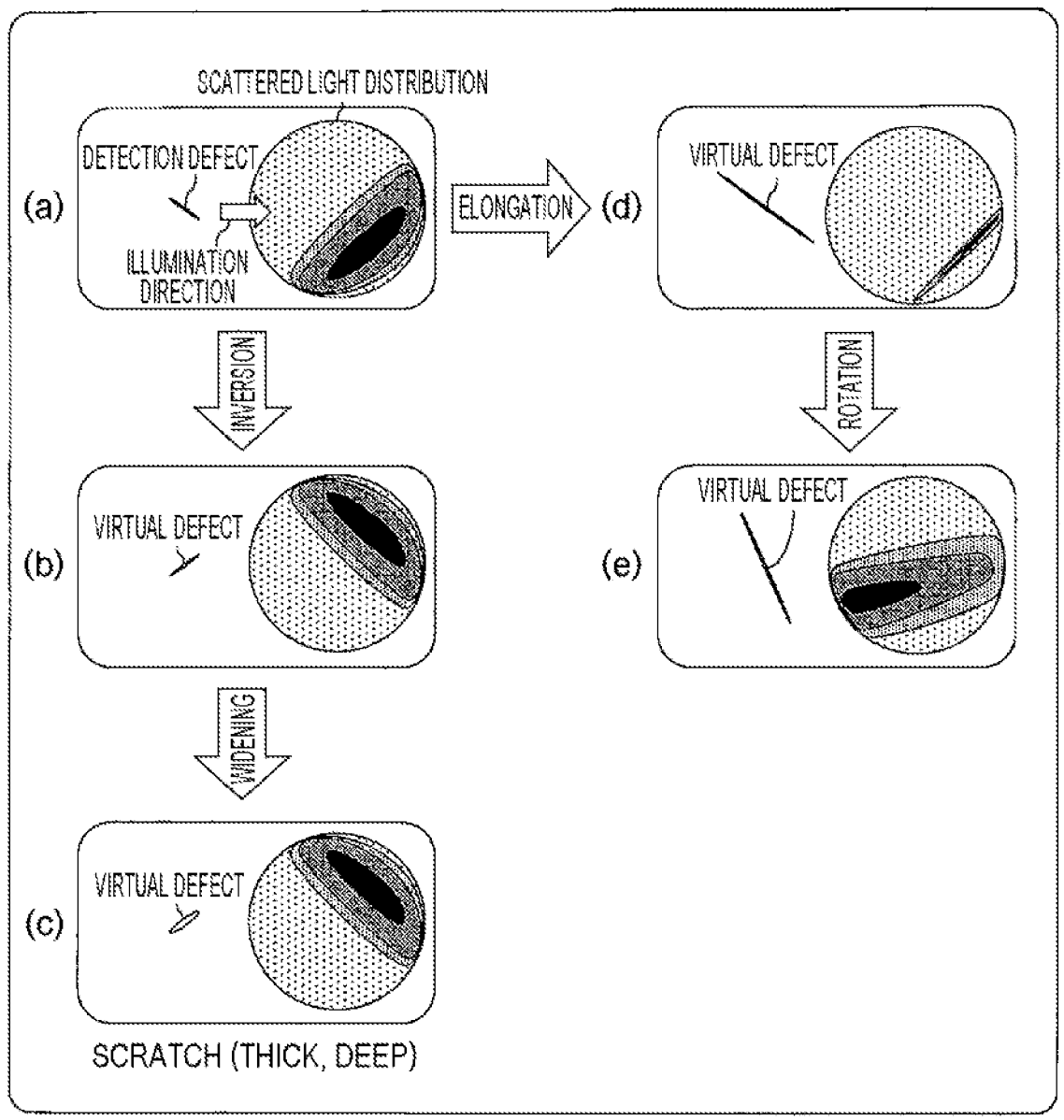
FIG. 29 is a diagram for explaining an example of a concept of generating a feature vector of a virtual defect obtained by changing a form of a detection defect from an actual measurement vector obtained for the detection defect.

FIG. 29 is a diagram for explaining an example of a concept of generating a feature vector of a virtual defect obtained by changing a form of a detection defect from an actual measurement vector obtained for the detection defect. The data learning circuit D5 also has a function of generating a feature vector for a virtual defect having at least one of a length, an angle, a thickness, and a depth different from that of the detection defect by affine transformation of the actual measurement vector of the detection defect, and accumulating the generated feature vector in the storage device DB as a feature vector of one instruction defect. As described above in the description of Steps S105 and S106 of FIG. 25, the data learning circuit D5 generates a feature vector of a virtual defect having an angle and a shape different from those of the detection defect for a defect having a unique shape represented by a scratch defect.

FIG. 29(a) illustrates a detection defect (for example, a scratch) having a unique shape and scattered light distribution of the detected detection defect. For this type of defect, for example, the scattered light distribution of the horizontally inverted image (mirror image) of the detection defect as illustrated in FIG. 29(b) or the extended image (extended length) of the detection defect as illustrated in FIG. 29(d) can be estimated from the scattered light distribution of the original detection defect. The same applies to a rotated image (one obtained by changing an angle), a widened image (one obtained by widening a width), and one obtained by changing a depth or a height. Therefore, in a case where the virtual defect in which the form of the detection defect is changed is assumed, it is possible to generate the feature vector of each virtual defect from the feature vector of the detection defect by applying the affine transformation. At this time, it is also possible to assume another virtual defect by changing the form of the virtual defect as illustrated in FIG. 29(c) or FIG. 29(e).

Figure 30:
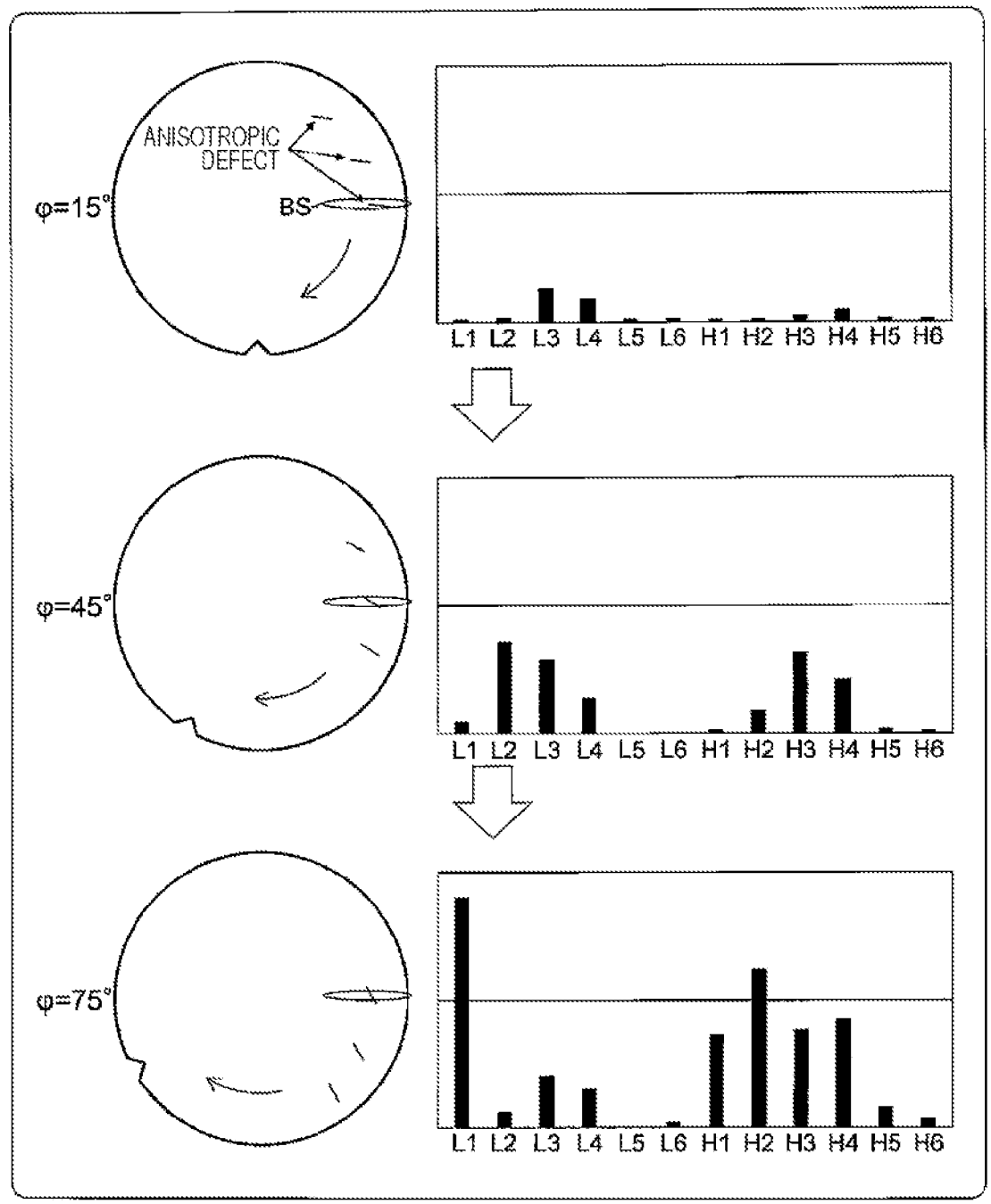
FIG. 30 is a diagram illustrating a relationship between an angle of a defect and scattering intensity distribution.

For example, in a case where two defects have the same shape and size and different angles, the scattered light intensity in each direction changes depending on the incident direction of the illumination light on the defect even though the same tendency is observed in the scattering azimuth of the scattered light based on the defect. FIG. 30 illustrates this state. FIG. 30 illustrates an example in which a sample being three parallel scratch defects having the same size and shape on the same r coordinate is scanned with a spiral trajectory. The upper portion of FIG. 30 illustrates how a first scratch crosses the illumination spot BS. The middle portion of FIG. 30 illustrates how a second scratch crosses the illumination spot BS. The lower portion of FIG. 30 illustrates how a third scratch crosses the illumination spot BS. It is assumed that the first scratch crosses the illumination spot BS at an angle of 15° with respect to the incident surface or the polarization direction of the illumination light, the second scratch crosses the illumination spot BS at an angle of 45°, and the third scratch crosses the illumination spot BS at an angle of 75°. The upper portion of FIG. 30 illustrates a set of signals σL1, . . . , and σH6 obtained when the first scratch crosses the illumination spot BS. The middle portion of FIG. 30 illustrates a signal set obtained by the second scratch. The lower portion of FIG. 30 illustrates a signal set obtained by the third scratch.

As illustrated in FIG. 30, even in a defect having the same size and shape, scattered light changes at an angle with respect to illumination light in a defect having a unique shape such as a scratch. For example, as illustrated in the example of FIG. 30, in the case of the scratch defect, scattered light tends to be scattered in a direction perpendicular to the defect, but the scattering intensity changes depending on the direction of the defect with respect to the illumination light. When $\varphi=15°$, σL3 becomes the maximum, but when $\varphi=45°$, σL2 becomes the maximum, and when $\varphi=75°$, σL1 becomes the maximum. The scattering azimuth of the scattered light changes with $\varphi$, and at the same time, the magnitude of the signal in the correspondence relationship also changes according to $\varphi$.

For example, in a case where the feature vector of the virtual defect in which the detection defect is rotated is generated, not only the sensor output is simply shifted by $\varphi$, but also the relationship between $\varphi$ and the signal intensity is obtained from the instruction defect data, and the feature vector of the virtual defect is adjusted in accordance with the relationship. Even in a case where not only the angle but also the length, the width, the depth, and the like of the defect are used as parameters, the feature vector of the virtual vector is adjusted as necessary in relationship between the parameter and the signal intensity. For example, in the case of defects having different lengths as illustrated in FIGS. 29(a) and 29(b), the width of the incident area of the scattered light changes in proportion to the square of the reciprocal of the length ratio of the scratches. In the case of defects having different thicknesses as illustrated in FIGS. 29(b) and 29(c), the brightness of the scattered light distribution changes in proportion to the square of the thickness or the depth of the defect.

However, when the detection defect and the virtual defect are bilaterally symmetric as illustrated in FIGS. 29(a) and 29(b), both the detection defect and the virtual defect have a mirror image relationship with respect to the incident surface of the illumination light. Therefore, when the polarization direction of the illumination light is symmetric to the incident surface (when the illumination light is P-polarized light, S-polarized light, or circularly polarized light), it is possible to generate the feature vector of the virtual defect by simply exchanging the signals bilaterally symmetrically.

By performing the affine transformation on the feature vectors of the detection defects to simulate a plurality of virtual defects in this manner, feature vectors of a large number of defects having different forms are generated from a single actual measurement vector. By accumulating the actual measurement vector of the detection defect and the feature vector of the virtual defect derived from the actual measurement vector, the instruction defect data is synergistically enhanced.

—Effects—

(1) According to the present embodiment, the feature vector of the virtual defect in which the form of the detection defect is changed is generated from the actual measurement vector of the detection defect, and is accumulated in the storage device DB as the feature vector of one instruction defect. As a result, differing from the case where only the actual measurement vector is accumulated as the instruction defect data, it is possible to sufficiently secure the instruction data amount for determining the defect. Even for a defect type having difficulty in being obtained, it is possible to obtain instruction data by simulating the defect type. By accumulating the instruction data of the defect in this manner, it is possible to sufficiently obtain the instruction defect data in terms of both variations and amounts, and to accurately determine the defect.

(2) Further, the variation in feature vectors of virtual defects having the same defect type as the detection defect is calculated based on the instruction defect data, and a plurality of feature vectors of virtual defects having the same defect type as the detection defect are generated and accumulated based on the actual measurement vector and the variation. By generating a plurality of feature vectors of virtual defects including variations from the actual measurement data of one detection defect in this manner, it is possible to obtain more highly valid instruction data for a specific defect type.

(3) Various variations of the virtual defect can be obtained by changing the type of the form to be changed, such as changing the angle of the detection defect with respect to the illumination azimuth of the illumination optical system A or the polarization direction of the illumination light, or changing the size of the detection defect. As described above, various variations of the form change are simulated, and the feature vector of the instruction defect is accumulated. Thus, the measurement accuracy of the feature can be expected to be improved for each defect type.

(4) In a case where the standard sample 1' is used, a large number of actual measurement vectors can be easily obtained for the same defect type as the standard defect, and feature vectors of a larger number of virtual defects can be generated from the actual measurement vectors. Therefore, it is possible to efficiently acquire instruction data for the same defect type as the standard defect.

(5) For a defect type having a unique shape, an actual measurement vector can be subjected to affine transformation to generate a feature vector of a virtual defect having at least one of a length, an angle, a thickness, and a depth different from a detection defect, and instruction defect data having various forms different from each other can be enriched.

(6) In the case of obliquely incident illumination, the detected light amount is insufficient due to the scattering direction, for example, the backward scattered light intensity is generally weakened. Therefore, the reliability of the filter processing can be secured by appropriately performing the integration processing on the detection signals αL1, . . . , and αV. However, if the signal after the integration processing is left as it is, there is also a case where the feature is ambiguous to finally determine the defect type. Therefore, in the present embodiment, as described above, the integrated signal is separated after the filter processing to secure the accuracy of the feature of the scattered light in each direction. Thus, the determination accuracy of the defect type can be improved.

(7) When integration processing is performed on the detection signal, the detection signal of the scattered light scattered in the left space is integrated with the detection signal of another scattered light similarly scattered in the left space. Similarly, the detection signal of the scattered light scattered in the right space is integrated with the detection signal of other scattered light scattered in the right space. In the case of an anisotropic defect, the amount of scattered light is significantly different between the left and right as described with reference to FIGS. 20 to 22. Thus, when an integration method of integrating the left and right detection signals of the backward scattered light is adopted, it is not possible to determine that the defect is an anisotropic defect with the integrated signal. On the other hand, in the present embodiment, by integrating the detection signals on the same right and left sides with respect to the illumination direction, the identification sensitivity of the anisotropic defect can be improved while adopting the method of integrating the detection signals.

(8) When obliquely incident illumination is performed, roughness scattered light from the sample surface generally has strong backward scattered light intensity and strong shot noise. For this reason, the backward scattered light intensity generally becomes noisy. Therefore, when the integration processing is performed, the detection signal of the forward scattered light (for example, the illumination scattered light to the left front) scattered to the same side on the left and right is mainly added to the detection signal of the backward scattered light (for example, the illumination scattered light to the left rear) to improve the SNR of the signal. As a result, it is possible to appropriately amplify the detection signal having low signal strength while securing the identification sensitivity of the anisotropic defect.

(9) In addition, in the integration processing, other detection signals are not necessarily added to all the detection signals, and at least one of the detection signals based on the illumination scattered light scattered forward is used for the filter processing without being added to other signals. Since the forward scattered light originally has high light intensity, adding a detection signal of scattered light having low light intensity to the detection signal conversely impairs the clarity of the feature of the detection signal of the forward scattered light. Therefore, the accuracy of the filter processing can be secured by using the forward scattered light in the subsequent processing without being integrated with other signals.

Second Embodiment

Figure 31:
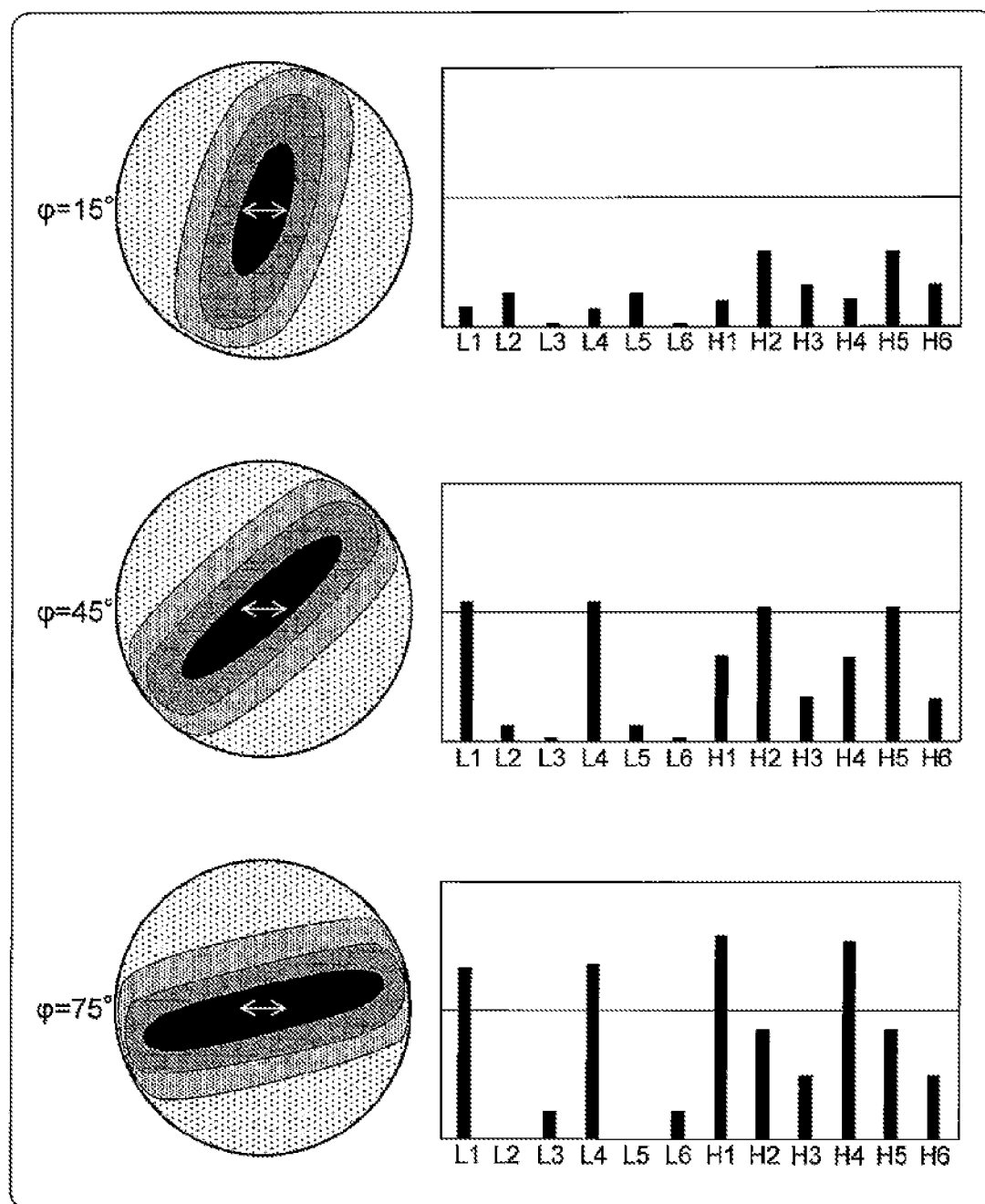
FIG. 31 is a diagram illustrating a relationship between an angle of a defect and scattering intensity distribution in a second embodiment of the present invention.

FIG. 31 is a diagram illustrating a relationship between an angle of a defect and scattering intensity distribution in a second embodiment of the present invention. In the present embodiment, an example of easily generating a feature vector of a virtual defect having an angle difference from a detection defect for a defect having a unique shape will be described. As described above, the defect inspection apparatus 100 has an epi-illumination mechanism that causes illumination light to be incident on the sample 1 from the normal direction of the surface of the sample 1, and the objective lenses of the detection optical systems B1 to B12 are arranged at intervals of a setting angle (in the present example, at intervals of 60 degrees) in the circumferential direction of the sample 1. Specifically, the objective lens is located in each of the low-angle regions L1 to L6 and the high-angle regions H1 to H6 in FIG. 7, and the objective lens is arranged at intervals of 60 degrees in the circumferential direction in each of the low-angle region and the high-angle region.

In the present embodiment, the data learning circuit D5 of the signal processing device D first generates an actual measurement vector of a detection defect (for example, a scratch defect) from a detection signal of illumination scattered light by the sensors C1 to C12 with respect to epi-illumination vertically incident on the sample 1. The epi-illumination is performed by driving the reflection mirror A7 by the control device E1 to deviate from the optical path of the illumination light as described above. The data learning circuit D5 generates the feature vector of the virtual defect in which the polarization direction of the illumination light and the direction of the defect are different by the setting angle (60 degrees in the present example) related to the arrangement of the objective lens based on the actual measurement vector obtained by the epi-illumination. The polarization direction of the illumination light is exemplified by an arrow at the center of a scattered light distribution diagram (contour diagram) of each of upper, middle, and lower stages in FIG. 31. In the present embodiment, the feature vector generated by the data learning circuit D5 represents a virtual defect obtained by rotating the detection defect detected by the epi-illumination by the setting angle, and is accumulated in the storage device DB as a feature vector of one instruction defect in association with information such as a defect type.

In the epi-illumination, illumination light is vertically incident on the sample surface. Thus, the relationship between the direction of the defect and the incident direction of the illumination light does not change differing from obliquely incident illumination. Therefore, when the example of three scratch defects of $\varphi=15°$, $45°$, and $75°$ described above with reference to FIG. 30 is applied to the present embodiment, the scattered light distribution obtained by the three defects rotates in accordance with $\varphi$ as illustrated in FIG. 31. As illustrated in the contour map, differing from the case of obliquely incident illumination, the scattered light distribution is approximately point-symmetric about the zenith of the celestial sphere, and the scattered light distribution also changes in angle about the zenith by the difference of $\varphi$ for the three defects. For example, the scattering azimuth of the illumination scattered light from the defect of $\varphi=15°$ and the scattering azimuth of the illumination scattered light from the defect of $\varphi=75°$ are shifted by 60°. Since the angular interval of the objective lens viewed from the illumination spot BS is also 60°, the detection pattern of the illumination scattered light is shifted one by one due to defects of $\varphi=15°$ and 75°. In practice, focusing on the low-angle region, peaks are detected in the regions L2 and L5 for the defect of $\varphi=15$, and peaks are detected in the regions L and L4 for the defect of $\varphi=75°$, and it can be understood that the detection patterns of the scattered light are shifted by 60°.

Therefore, in a case where the objective lenses of the low-angle or high-angle detection optical system B are arranged in the circumferential direction at intervals of the setting angle $\varphi L$, when the actual measurement vector of the detection defect at the angle $\varphi$ is obtained, the feature vector of the virtual defect at the angle $(\varphi+\varphi L)$ can be generated by shifting the sensor output one by one in the circumferential direction. However, since the scattered light intensity changes depending on the relationship between the polarization direction of the illumination light and the direction of the defect as illustrated in FIG. 1, the intensity of each signal defining the feature vector of the virtual defect is corrected by multiplying the intensity by a gain corresponding to the angle difference between the detection defect and the virtual defect. When the epi-illumination is circularly polarized light, the difference in scattered light intensity due to the relationship between the polarization direction of the illumination light and the direction of the defect can be suppressed, so that correction by the gain can be unnecessary.

According to the present embodiment, it is possible to more simply obtain a feature vector of a virtual defect with a different angle of a detection defect under the condition of epi-illumination.

Third Embodiment

Figure 32:
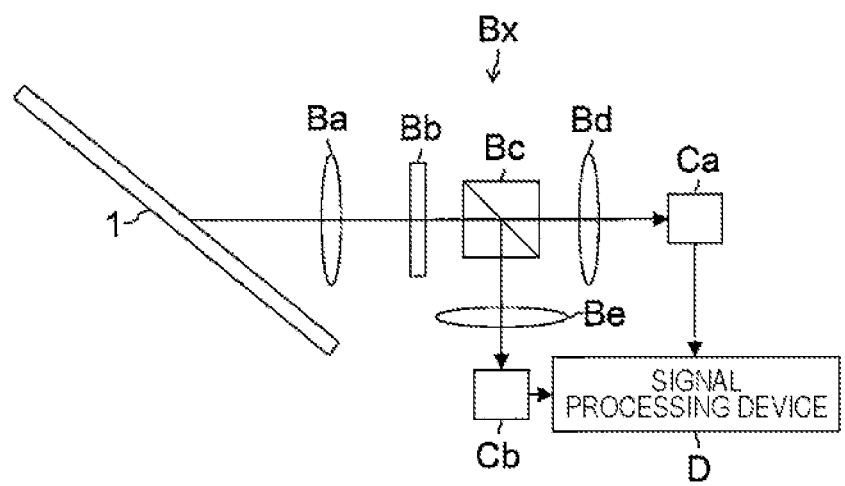
FIG. 32 is a configuration diagram of a detection optical system provided in a defect inspection apparatus according to a third embodiment of the present invention.

FIG. 32 is a configuration diagram of a detection optical system provided in a defect inspection apparatus according to a third embodiment of the present invention. The present embodiment is a first example in which the signal processing device D simulates a feature vector obtained in a case where detection conditions of a plurality of detection optical systems are changed with respect to a detection defect, and accumulates the feature vector in the storage device DB as a feature vector of one instruction defect equal to the detection defect. That is, this is an example of obtaining instruction data for the same defect for each detection condition by focusing on the fact that the obtained feature vector changes when the detection condition is changed even for the same defect. Except for the points described below, the defect inspection apparatus in the present embodiment is similar to the defect inspection apparatus in the first embodiment or the second embodiment.

Also in the defect inspection apparatus according to the present embodiment, similarly to the first embodiment, the obliquely incident illumination mechanism is provided, and the arrangement of the objective lens of each detection optical system is a target with the obliquely incident illumination incident surface on the sample 1 interposed therebetween.

In the defect inspection apparatus in the present embodiment, each of the detection optical systems B1 to B13 (or some detection optical systems) is configured as a detection optical system Bx illustrated in FIG. 32, and a polarizing plate Bb can control the polarization direction of the illumination scattered light to be transmitted. Specifically, the detection optical system Bx includes a condenser lens (objective lens) Ba, a ½ wavelength plate Bb, a polarization beam splitter Bc, and imaging lenses Bd and Be. The scattered light incident on the detection optical system Bx from the sample 1 is condensed by the condenser lens Ba, and the polarization direction thereof is controlled by the ½ wavelength plate Bb. The polarizing plate Bb is rotatable by a drive mechanism (not illustrated), and the control device E1 is configured to control the drive mechanism to adjust the rotation angle of the polarizing plate Bb, thereby controlling the polarization direction of the illumination scattered light incident on the sensor. The illumination scattered light whose polarization is controlled by the polarizing plate Bb is subjected to optical path splitting by the polarizing beam splitter Bc in accordance with the polarization direction, and is incident on the imaging lenses Bd and Be. The scattered illumination light incident on the imaging lens Bd is photoelectrically converted by the sensor Ca, and a detection signal thereof is input to the signal processing device D. The scattered illumination light incident on the imaging lens Be is photoelectrically converted by the sensor Cb, and a detection signal thereof is input to the signal processing device D.

By providing such a detection optical system, the polarization direction of the light to be split by the polarization beam splitter Bc can be changed in accordance with the purpose of inspection. This configuration is useful because the polarization characteristics are different for each defect type. It is also possible to generate a plurality of actual measurement vectors with different detection conditions for the same defect by variously changing and detecting the polarization direction of the illumination scattered light from the same defect.

Figure 33:
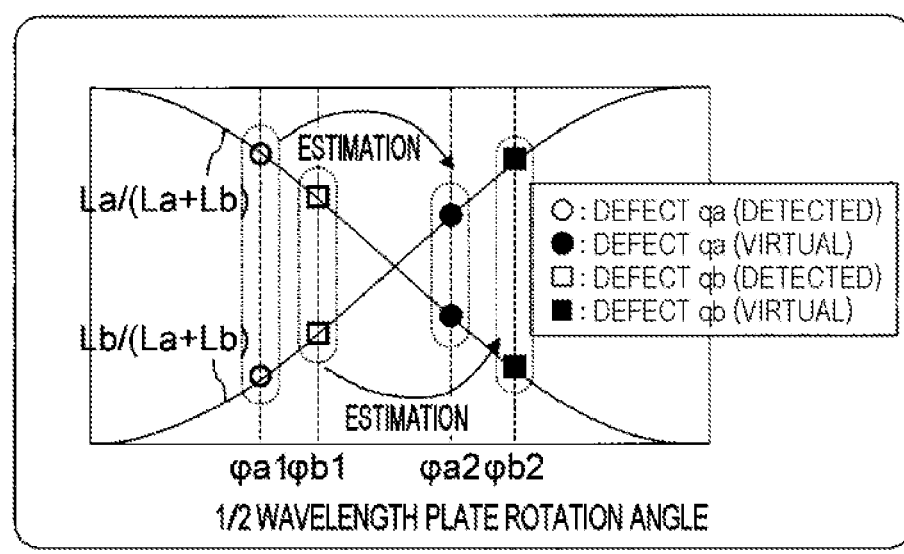
FIG. 33 is a diagram illustrating a relationship between a polarization direction and scattering intensity of illumination scattered light in the third embodiment of the present invention.
Figure 34:
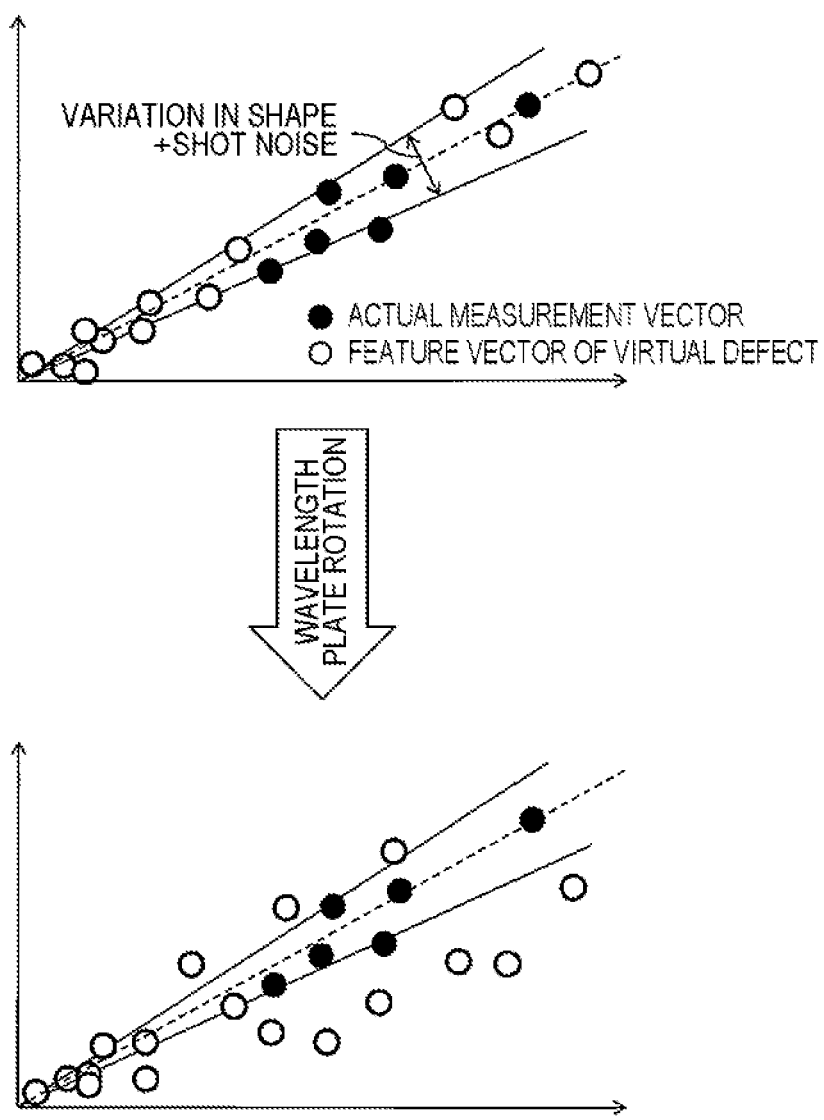
FIG. 34 is a view illustrating a feature vector conversion concept of an instruction defect stored in a storage device in the third embodiment of the present invention.

In addition, in the case of the configuration capable of simultaneously detecting two beams of polarized light as illustrated in FIG. 32, the expected light amount in a case where the ½ wavelength plate Bb is rotated by a predetermined angle can be estimated from the detected light amount detected for the same defect based on the relationship of a tan 2 regarding the detection signals of the sensors Ca and Cb. Assuming that the detection light amounts of the sensors Ca and Cb are La and Lb, the signal processing device D can estimate the detection light amount expected when the same defect qa is detected at the rotation angle φa2 of the ½ wavelength plate Bb from the detection light amount of the defect qa detected at the rotation angle φa1 of the ½ wavelength plate Bb (FIG. 33). Similarly, the detection light amount expected when the same defect qb is detected at the rotation angle φb2 of the ½ wave plate Bb can be estimated from the detection light amount of the defect qb detected at the rotation angle φb1 of the ½ wave plate Bb. For example, in a case where the data learning circuit D5 of the signal processing device D performs an inspection by changing the inspection condition, that is, the rotation angle of the ½ wave plate Bb, the data learning circuit D5 converts the feature vector of the instruction defect stored in the storage device DB into a value corresponding to the rotation angle of the ½ wave plate Bb as illustrated in FIG. 34. In FIG. 34, the feature space is represented in two dimensions for the simplicity of the drawing. According to the present embodiment, even though there is no instruction data of the virtual defect in which the detection condition matches, the defect determination can be accurately performed by converting and utilizing the instruction data in accordance with the detection condition as described above.

The control mechanism of the polarization direction of the illumination scattered light also contributes to the facilitation of the generation of the feature vector of the virtual defect. For example, the control device E1 controls the rotation angle of the polarizing plate Bb to control the illumination scattered light so as to have a symmetrical polarization direction with respect to the incident surface of obliquely incident illumination on the sample 1. That is, the illumination scattered light is set to P-polarized light, S-polarized light, or circularly polarized light. The data learning circuit D5 generates an actual measurement vector of the detection defect from the detection signal obtained under this detection condition. In this case, assuming a virtual defect having a shape in which the detection defect is laterally inverted, it is expected that the scattered light distribution obtained under the same detection condition is bilaterally symmetrical with the detection defect. Thus, the data learning circuit D5 is configured to generate the feature vector of the virtual defect having the inverted shape by exchanging the outputs of the sensors in which the arrangement of the corresponding objective lens is symmetrical across the incident surface of the illumination light with respect to the plurality of detection signals based on the actual measurement vector. As a result, the feature vector of the virtual defect having the inverted shape of the detection defect can be easily generated and accumulated in the storage device DB as one instruction defect.

Fourth Embodiment

Figure 35:
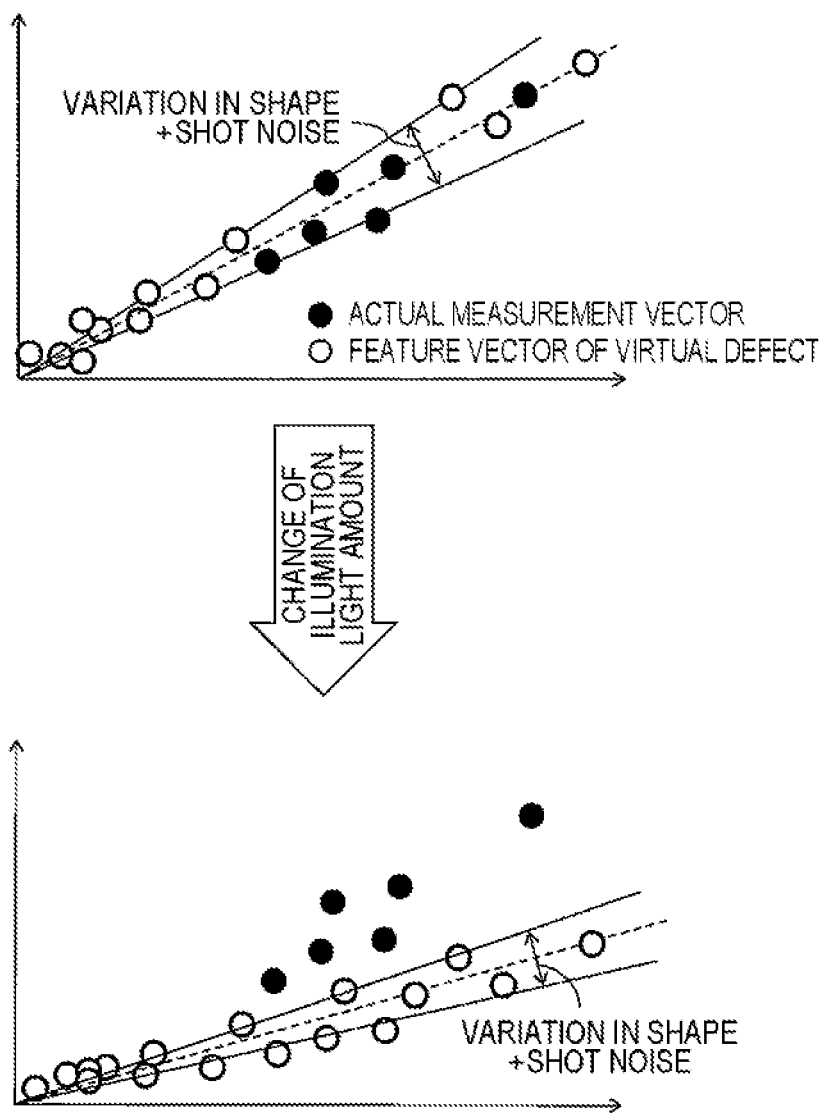
FIG. 35 is a view illustrating a feature vector conversion concept of an instruction defect stored in a storage device in a fourth embodiment of the present invention.

FIG. 35 is a view illustrating a feature vector conversion concept of an instruction defect stored in the storage device DB in a fourth embodiment of the present invention. The present embodiment is a second example in which the signal processing device D simulates a feature vector obtained in a case where detection conditions of a plurality of detection optical systems are changed with respect to a detection defect, and accumulates the feature vector in the storage device DB as a feature vector of one instruction defect equal to the detection defect. The detection condition changed in the present embodiment is the illumination light amount with which the defect is irradiated. The illumination light amount can be changed by the illumination time (scanning time) of the defect or the light amount of the illumination light. The illumination time of the defect is changed in a manner that the control device E1 controls the rotation speed of the sample stand ST1 by the scanning device ST2. The light amount of the illumination light is changed in a manner that the control device E1 controls the intensity of the illumination light by the laser light source A1 and the attenuation amount of the illumination light by the attenuator A2. Except for the points described below, the defect inspection apparatus in the present embodiment is similar to the defect inspection apparatus in the first embodiment, the second embodiment, or the third embodiment.

Since high throughput is required in the actual inspection of the defect actually performed in the semiconductor manufacturing process, the inspection time needs to be minimized. In the high-throughput actual inspection, the illumination light amount with which the defect is irradiated cannot be sufficiently secured. In addition, it may be difficult to discriminate between the defect and the noise, and it may be difficult to detect the defect (particularly, the minute defect). Therefore, it is not necessarily easy to comprehensively accumulate instruction data of defects in the actual inspection performed in the semiconductor manufacturing process.

On the other hand, it takes a long time to perform the defect inspection not in the process of the semiconductor manufacturing process but for the instruction defect performed in order to collect instruction defect data. Therefore, regarding the collection of instruction defect data, the throughput is ignored, and a sufficient number of photons are acquired from the defect to generate a highly accurate feature vector. As a sample used for collecting instruction defect data, any of a sample extracted from the semiconductor manufacturing process, a sample determined to be defective in the semiconductor manufacturing process, a standard sample as illustrated in FIG. 27, and the like can be used. Then, the high-accuracy feature vector is corrected in accordance with the inspection condition (scanning time, illumination light amount, and the like) of the actual inspection, and the corrected feature vector is accumulated in the storage device DB as instruction data of the defect. Since the data learning circuit D5 performs such processing and accumulates a large number of feature vectors of instruction defects with high validity obtained by the processing, improvement of defect detection accuracy can be expected.

Fifth Embodiment

Figure 36:
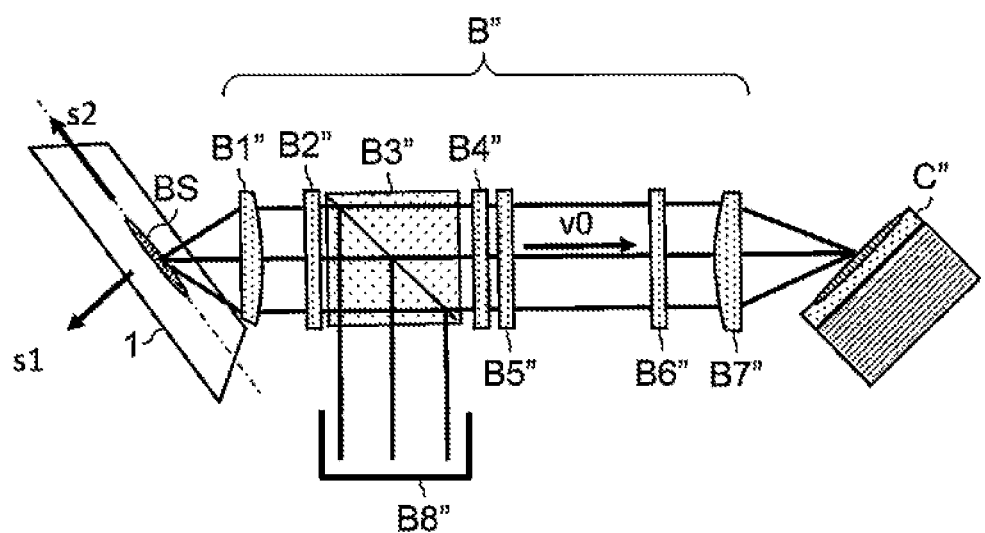
FIG. 36 is a first configuration diagram of a configuration example of a detection optical system and a sensor provided in the defect inspection apparatus according to the second embodiment of the present invention.
Figure 37:
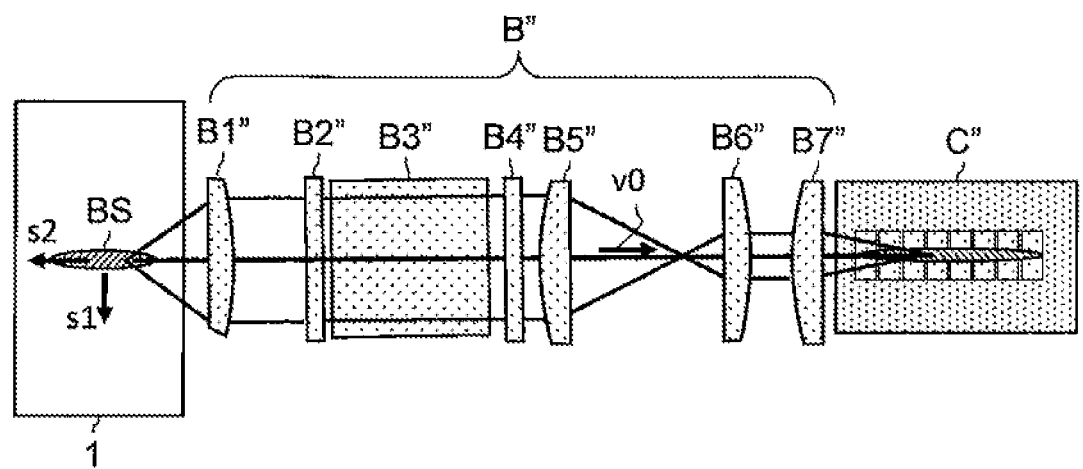
FIG. 37 is a second configuration diagram of the configuration example of the detection optical system and the sensor provided in the defect inspection apparatus according to the second embodiment of the present invention.
Figure 38:
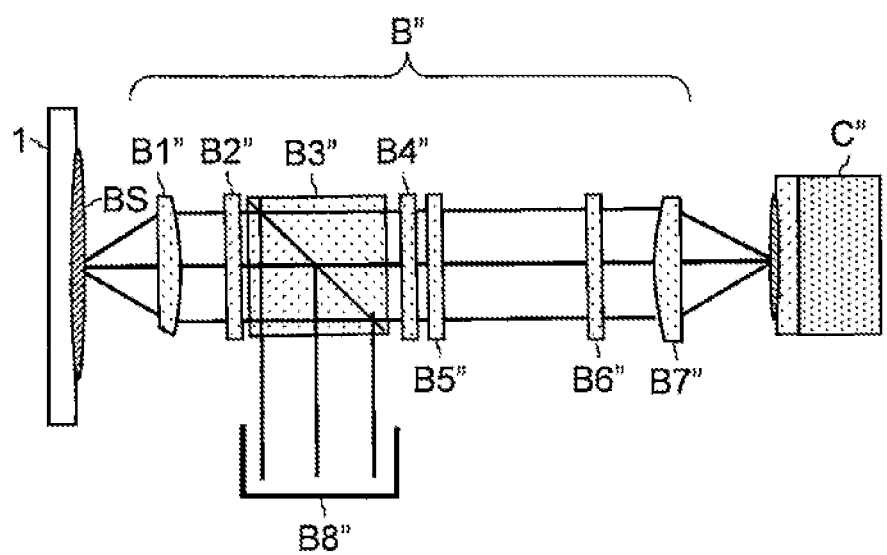
FIG. 38 is a configuration diagram of another configuration example of the detection optical system and the sensor provided in the defect inspection apparatus according to the second embodiment of the present invention.

In the first embodiment, an example in which a single-pixel point sensor is used as the sensors C1 to Cn and C3' has been described, but the present invention is also applicable to a defect inspection apparatus using a one-dimensional or two-dimensional sensor having a plurality of pixels. FIGS. 36 to 38 illustrate configurations of the detection optical system using the sensor having a plurality of pixels and the sensor. FIG. 37 is a diagram of the detection optical system illustrated in FIG. 36 when viewed from the upper side in FIG. 36. FIGS. 36 and 37 illustrate a configuration in which the sensor is inclined with respect to the detection optical axis. FIG. 38 illustrates a configuration in which the sensor is perpendicular to the detection optical axis.

The defect inspection apparatus in the present embodiment corresponds to an apparatus in which the units of the detection optical system and the sensor of the defect inspection apparatus 100 in the first embodiment are replaced with the configuration example of FIGS. 36 and 37 or the configuration example of FIG. 38. A detection optical system B" illustrated in FIGS. 36 to 38 includes a condenser lens B1", a ½ wavelength plate B2", a polarization beam splitter B3", a ½ wavelength plate B4", cylindrical lenses B5" and B6", an imaging lens B7", and a beam diffuser B8". The illumination scattered light incident on the detection optical system B" is guided to the sensor C". As the sensor C", a CCD sensor, a CMOS sensor, a position sensing detector (PSD), or the like can be used.

In the detection optical system B", the illumination scattered light is condensed by the condenser lens B1", and the polarization direction thereof is controlled by the ½ wavelength plate B2". The ½ wave plate B2" is rotatable by an actuator (not illustrated). The optical path of the light transmitted through the 2/2 wavelength plate B2" is branched by the polarization beam splitter B3" in response to the polarization. The combination of the ½ wavelength plate B2" and the polarization beam splitter B3" makes it easy to separate the optical signal indicating the defect of the sample 1 and the optical signal that inhibits the defect detection of the sample 1 (roughness scattered light from the surface of the sample 1). The light transmitted through the polarization beam splitter B3" is controlled by the ½ wavelength plate B4" in a polarization direction suitable for detection in the sensor C". The cross-sectional shape is adjusted by the optical cylindrical lenses B5" and B6" transmitted through the ½ wavelength plate B4", and guided to the sensor C" through the imaging lens B7". An optical image of the illumination spot $2^0$ is formed on the sensor C" having a plurality of pixels. The detection signal of the optical image photoelectrically converted by each pixel of the sensor C" is output to the signal processing device D similarly to the first to fifth embodiments. Note that the light branched in the optical path by the polarization beam splitter B3" is attenuated by the beam diffuser B8" so as not to become stray light.

As described above, the present invention is also applicable to a defect inspection apparatus using a plurality of sensors having a plurality of pixels. For example, by replacing the detection signals $\alpha L1, \ldots,$ and $\alpha V$ in the first embodiment with a representative value (for example, a maximum value or a median value) of a plurality of detection signals output from each pixel for each sensor and performing processing similar to that in the first embodiment, it is possible to obtain an effect similar to that of the first embodiment. The sensor having a plurality of pixels is similarly applicable to the second to fifth embodiments.

Modification Examples

Note that, in the above description, the configuration of the signal integration circuit D1 illustrated in FIG. 10 (that is, a combination of signal integration) is an example, and the combination of signal integration can be appropriately changed in accordance with the configurations of the illumination optical system and the detection optical system and the purpose of inspection. The arrangement and the number of regions L1, . . . , and V for detecting scattered light can also be changed as appropriate.

Although the example in which the detection signals are integrated by the signal integration circuit D1 and the defect is detected by the third signal group has been described, the signal integration is not necessarily performed, and the defect detection may be configured to be performed by the sensor output. In this case, the signal integration circuit D1 and the signal separation circuit D3 are not essential and both are substantially possible.

The first example described with reference to FIG. 11 and the second example described with reference to FIGS. 12 to 14 are also examples of the filter processing performed by the filter circuit D2. The processing content can be appropriately changed as long as the SN ratio of the signal $\beta L1, \ldots,$ or $\beta V$ output from the signal integration circuit D1 can be exemplified.

Also in the signal separation circuit D3, the configuration illustrated in FIG. 23 (that is, a combination of a signal to be subtracted and a signal to be used for subtraction from the subtracted signal) is an example, and the combination of signal separation can be appropriately changed similarly to the signal integration circuit D1.

The method described with reference to FIG. 24 is also an example of the defect detection principle by the defect detection circuit D4, and other methods can be adopted. For example, in FIG. 24, the case of defect detection, that is, a method of determining whether a detection defect is a DOI or other than the DOI (one class classification) has been described, but a plurality of classes may be classified. In the one-class classification, it is only determined whether a detection defect is a DOI, and, for a detection defect that is not a DOI, whether the detection defect is a defect or noise is not distinguished. On the other hand, in the two-class classification, the specific defect type as the DOI is set as the first class and the nuisance as the second class, and it is determined whether the detection defect is the DOI or the nuisance instructed in advance. Noise or the like that does not match the features instructed in advance as the nuisance is not classified as the nuisance. In a case where classification into two classes is performed by using the standard sample 1' of FIG. 27, for example, the feature of the detection defect detected in a region other than the regions AR1 to AR6 on the surface of the standard sample 1' is actively associated with information indicating nuisance, and is accumulated in the storage device DB as a feature vector of the instruction defect. Machine learning such as a local Mahalanobis distance, a Local Subspace Classifier, a 2-class SVM, and a Nearest Neighbor can be applied to the feature space determination of the two-class classification.

In a case where classification of more N classes (N >3) is performed, it is possible to adopt a method of determining which class the detection defect is classified into. For example, using the following (Expression 6)-(Expression 8), the detection defect can be classified into a defect class satisfying the conditions of (Expression 6) and (Expression 8) or a defect class satisfying the conditions of (Expression 7) and (Expression 8).

$$P(DOI|q)=P(q|DOI)P(DOI)/\Sigma_c P(C)P(q|c)>Th1 \quad \text{(Expression 6)}$$

$$DOI=\text{argmax}_c P(c|q) \quad \text{(Expression 7)}$$

$$P(q|DOI)>Th2 \quad \text{(Expression 8)}$$

q: feature vector of the detection defect in the feature space
DO: label indicating class (defect type to be detected)
C: class
P(DOI|q): probability that q is a DOI
P(q|DOI): probability that a defect classified as a DOI has a feature represented by q
P(DOI): probability that the DOI will occur
P (c): probability of an occurrence of a defect of a specific class
Th1: determination threshold value (setting value)
Th2: determination threshold value (setting value)

According to (Expression 6) described above, it is determined whether or not the probability that the detected feature q is a DOI of a specific class is a predetermined value or more. According to (Expression 7), it is determined whether the feature q is classified into a DOI of a specific class. In (Expression 8), it is determined whether the probability that the feature q is observed as the DOI of the specific class is equal to or greater than a predetermined value. That is, in a case where the possibility that the detection defect is in the specific class is equal to or more than a predetermined value and the possibility that the defect in the specific class has the feature of the detection defect is equal to or more than a predetermined value during the instruction, the detection defect is determined to be the defect in the class. For example, even though the specific class is closest to the feature q of the detection defect, the detection defect is not classified as the defect of the specific class as long as the feature q is a feature that the defect of the class cannot take.

REFERENCE SIGNS LIST 1 sample
1' standard sample
100 defect inspection apparatus
A illumination optical system
AR1-AR6 region (known position of standard defect)
B1-Bn, Bx, B'3, B" detection optical system
B1", B3a, Ba condenser lens (objective lens)
Bb ½ polarizing plate
BS illumination spot
C1-Cn, C" sensor
D SIGNAL PROCESSING DEVICE
DB storage device
PS1-PS6 known particle diameter (size) of standard defect
ST1 sample stand
ST2 scanning device
Var(S) variation
$\alpha L1$-$\alpha L6$, $\alpha H1$-$\alpha H6$, $\alpha V$ detection signal
$\beta L1$-$\beta L6$, $\beta H1$-$\beta H6$, $\beta V$ RV signal
$\gamma L1$-$\gamma L6$, $\gamma H1$-$\gamma H6$, $\gamma V$ signal
$\delta L1$-$\delta L6$, $\delta H1$-$\delta H6$, $\delta V$ signal
$\varphi$ defect angle
$\varphi a1$, $\varphi a2$, $\varphi b1$, $\varphi b2$ angle of polarizing plate

The invention claimed is:

1. A defect inspection apparatus for detecting a defect in a semiconductor substrate, the defect inspection apparatus comprising:
a sample stand that supports a sample of the semiconductor substrate;
an illumination optical system that irradiates the sample placed on the sample stand with illumination light;
a scanning device that drives the sample stand to change a relative position between the sample and the illumination optical system;
a plurality of detection optical systems that condense illumination scattered light from a surface of the sample;
a plurality of sensors that convert the illumination scattered light condensed by a corresponding detection optical system into an electric signal and outputs a detection signal;
a storage device that stores a plurality of feature vectors for each defect type with respect to an instruction defect for defect determination; and
a signal processing device that processes detection signals input from the plurality of sensors,
wherein the signal processing device;
calculates a plurality of actual measurement vectors, each of the plurality of actual measurement vectors is a feature vector of a detection defect on the surface of the sample detected by the plurality of sensors, wherein a size of each of the plurality of actual measurement vectors is a discrete value,
calculate expected values for feature values of a virtual data with a same defect type as the plurality of actual measurement vectors,
calculate a variation in each of the expected values,
calculates, using the variation in each of the expected values, a plurality of feature vectors of the virtual defect having the same defect type, and
stores each the plurality of feature vectors of the virtual defect in the storage device instruction defect corresponding to the same defect.

2. The defect inspection apparatus according to claim 1, wherein a form of the detection defect is an illumination azimuth of the illumination optical system or an angle of the defect with respect to a polarization direction of the illumination light.

3. The defect inspection apparatus according to claim 1, wherein a form of the detection defect is a defect size.

4. The defect inspection apparatus according to claim 1, wherein each of the plurality of feature vectors is further determined based on a plurality of actual measurement vectors acquired by inspecting a standard sample having a plurality of standard defects that have known sizes and known positions.

5. The defect inspection apparatus according to claim 1, wherein the signal processing device performs affine transformation on each of the plurality of actual measurement vectors to generate a respective feature vector for a respective virtual defect having at least one of a length, an angle, a thickness, and a depth different from those of the detection defect.

6. The defect inspection apparatus according to claim 1, wherein
objective lenses of the plurality of detection optical systems are arranged at intervals of a setting angle in a circumferential direction of the sample, and
the signal processing device
generates each of the plurality of actual measurement vectors from the detection signal of the illumination scattered light with respect to illumination light incident on the sample from a normal direction of the surface of the sample, and
for each of the plurality of feature vectors of the virtual defect in which a polarization direction of the illumination light and a defect direction are different is further determined by the setting angle based on the actual measurement vector.

7. The defect inspection apparatus according to claim 1, wherein
each of the plurality of detection optical systems includes a polarizing plate that controls the polarization direction of light to be transmitted, and
an arrangement of an objective lens with an incident surface of the illumination light on the sample interposed therebetween is a target, and
the signal processing device
generates each of the plurality of actual measurement vectors from the detection signal of the illumination scattered light in which polarization direction is controlled by the polarizing plate in a direction symmetric to the incident surface,
exchanges outputs of sensors having corresponding objective lenses that are arranged symmetrically with respect to the incident surface, for each of a plurality of detection signals set as a base corresponding to at least one of the plurality of actual measurement vectors, and
for each of the plurality of feature vectors of the virtual defect is further determined by inverting the detection defect.

8. The defect inspection apparatus according to claim 1, wherein the signal processing device simulates a feature vector obtained in a case where a detection condition for the detection defect is changed, and accumulates the simulated feature vector in the storage device as a respective feature vector of a respective instruction defect corresponding to the detection defect.

9. The defect inspection apparatus according to claim 8, wherein the detection condition is angles of polarizing plates of the plurality of detection optical systems.

10. The defect inspection apparatus according to claim 8, wherein the detection condition is a scanning speed of the scanning device.

* * * * *